(12) United States Patent
Burba, III

(10) Patent No.: US 8,936,770 B2
(45) Date of Patent: Jan. 20, 2015

(54) HYDROMETALLURGICAL PROCESS AND METHOD FOR RECOVERING METALS

(75) Inventor: John L. Burba, III, Parker, CO (US)

(73) Assignee: Molycorp Minerals, LLC, Greenwood Village, CO (US)

(*) Notice: Subject to any disclaimer, the term of this patent is extended or adjusted under 35 U.S.C. 154(b) by 320 days.

(21) Appl. No.: 13/010,609

(22) Filed: Jan. 20, 2011

(65) Prior Publication Data

US 2011/0182786 A1 Jul. 28, 2011

Related U.S. Application Data

(60) Provisional application No. 61/297,536, filed on Jan. 22, 2010, provisional application No. 61/427,745, filed on Dec. 28, 2010, provisional application No. 61/432,075, filed on Jan. 12, 2011.

(51) Int. Cl.
| | |
|---|---|
| *C01F 17/00* | (2006.01) |
| *C22B 3/02* | (2006.01) |
| *C22B 3/04* | (2006.01) |
| *C22B 3/20* | (2006.01) |
| *C22B 3/42* | (2006.01) |
| *C22B 23/00* | (2006.01) |
| *C22B 34/34* | (2006.01) |

(52) U.S. Cl.
CPC .............. *C22B 3/02* (2013.01); *C01F 17/0062* (2013.01); *C01F 17/0012* (2013.01); *C01F 17/00* (2013.01); *C22B 3/04* (2013.01); *C22B 3/20* (2013.01); *C22B 3/42* (2013.01); *C22B 23/00* (2013.01); *C22B 34/34* (2013.01)
USPC ........................................... 423/21.1; 423/20

(58) Field of Classification Search
None
See application file for complete search history.

(56) References Cited

U.S. PATENT DOCUMENTS

| | | | |
|---|---|---|---|
| 2,916,357 A | 12/1959 | Schaufelberger | |
| 3,309,140 A * | 3/1967 | Gardner et al. ................... | 299/4 |
| 3,711,591 A | 1/1973 | Hurst et al. | |
| 3,808,305 A | 4/1974 | Gregor | |
| 3,937,783 A | 2/1976 | Wamser et al. | |
| 4,107,264 A | 8/1978 | Nagasubramanian et al. | |
| 4,278,640 A | 7/1981 | Allen et al. | |
| 4,326,935 A | 4/1982 | Moeglich | |
| 4,486,283 A | 12/1984 | Tejeda | |
| 4,676,957 A * | 6/1987 | Martin et al. ................. | 423/21.5 |
| 4,740,281 A | 4/1988 | Chlanda et al. | |

(Continued)

FOREIGN PATENT DOCUMENTS

| | | |
|---|---|---|
| CN | 1888099 | 1/2007 |
| CN | 101008047 | 8/2007 |

(Continued)

OTHER PUBLICATIONS

"8.11 Chlor-Alkali," Chapter 8.11 of Compilation of Air Pollutant Emission Factors, vol. 5, 5th Edition, Jan. 1995, http://www.epa.gov/ttn/chief/ap42/ch08/final/c08s11.pdf, 6 pages.

(Continued)

*Primary Examiner* — Melissa Swain
(74) *Attorney, Agent, or Firm* — Sheridan Ross P.C.

(57) ABSTRACT

A mineral processing facility is provided that includes a cogen plant to provide electrical energy and waste heat to the facility and an electrochemical acid generation plant to generate, from a salt, a mineral acid for use in recovering valuable metals.

69 Claims, 10 Drawing Sheets

(56) References Cited

U.S. PATENT DOCUMENTS

| | | | |
|---|---|---|---|
| 4,880,513 | A | 11/1989 | Davis et al. |
| 4,880,607 | A * | 11/1989 | Horton et al. ............... 423/20 |
| 5,006,216 | A | 4/1991 | Dietrich |
| 5,071,804 | A | 12/1991 | Kuznicki |
| 5,102,556 | A | 4/1992 | Wong |
| 5,126,019 | A | 6/1992 | Rutherford et al. |
| 5,192,418 | A | 3/1993 | Hughes |
| 5,207,995 | A | 5/1993 | Bosserman |
| 5,223,022 | A | 6/1993 | Kuznicki |
| 5,225,054 | A | 7/1993 | Boateng |
| 5,236,492 | A | 8/1993 | Shaw et al. |
| 5,246,559 | A | 9/1993 | Bishara |
| 5,250,159 | A | 10/1993 | Butterworth |
| 5,279,745 | A | 1/1994 | Jeffers |
| 5,282,935 | A | 2/1994 | Cawlfield et al. |
| 5,290,410 | A | 3/1994 | Tenfalt et al. |
| 5,292,412 | A | 3/1994 | Pitton |
| 5,352,345 | A | 10/1994 | Byszewski et al. |
| 5,354,458 | A | 10/1994 | Wang |
| 5,405,507 | A | 4/1995 | Bishara |
| 5,405,509 | A | 4/1995 | Lomasney |
| 5,419,816 | A | 5/1995 | Sampson |
| 5,425,800 | A | 6/1995 | Buter et al. |
| 5,433,931 | A * | 7/1995 | Bosserman ............... 423/21.1 |
| 5,474,661 | A | 12/1995 | Bishara |
| 5,489,370 | A | 2/1996 | Lomasney |
| 5,498,321 | A | 3/1996 | Arnold |
| 5,534,160 | A | 7/1996 | Hong et al. |
| 5,578,547 | A | 11/1996 | Summers |
| 5,593,627 | A | 1/1997 | Bishara |
| 5,597,811 | A | 1/1997 | Gruber |
| 5,602,071 | A | 2/1997 | Summers |
| 5,609,742 | A | 3/1997 | Sampson |
| 5,621,088 | A | 4/1997 | Gruber |
| 5,635,071 | A | 6/1997 | Al-Samadi |
| 5,645,703 | A | 7/1997 | Tsai |
| 5,679,235 | A * | 10/1997 | Harrison ............... 205/334 |
| 5,705,050 | A | 1/1998 | Sampson |
| 5,733,489 | A | 3/1998 | Hill |
| 5,766,789 | A | 6/1998 | James |
| 5,770,090 | A | 6/1998 | Lewis |
| 5,783,061 | A | 7/1998 | Schuurman et al. |
| 5,827,411 | A | 10/1998 | Bishara |
| 5,858,199 | A | 1/1999 | Hanak |
| 5,976,847 | A | 11/1999 | Hermann |
| 6,024,850 | A | 2/2000 | Sampson |
| 6,030,520 | A | 2/2000 | Dziewinski |
| 6,077,621 | A | 6/2000 | Allen |
| 6,117,286 | A | 9/2000 | Shimamune |
| 6,162,361 | A | 12/2000 | Adiga |
| 6,277,265 | B1 | 8/2001 | Hanak |
| 6,294,066 | B1 | 9/2001 | Mani |
| 6,395,061 | B1 | 5/2002 | Duyvesteyn |
| 6,395,678 | B1 | 5/2002 | Summers |
| 6,402,916 | B1 | 6/2002 | Sampson |
| 6,416,645 | B1 | 7/2002 | Sampson |
| 6,436,275 | B1 | 8/2002 | Dziewinski |
| 6,451,485 | B1 | 9/2002 | James |
| 6,673,127 | B1 | 1/2004 | Allen |
| 6,770,249 | B1 | 8/2004 | Hoboy et al. |
| 6,780,893 | B2 | 8/2004 | Sugaya |
| 6,814,865 | B1 | 11/2004 | Aminabhavi et al. |
| 6,843,922 | B1 | 1/2005 | Summers, Jr. |
| 6,854,602 | B2 | 2/2005 | Oyama |
| 6,863,873 | B1 | 3/2005 | Hoboy |
| 7,179,325 | B2 | 2/2007 | Oyama |
| 7,179,860 | B2 | 2/2007 | Cao |
| 7,247,229 | B2 | 7/2007 | Hardee |
| 7,255,798 | B2 | 8/2007 | Grot |
| 7,297,373 | B2 | 11/2007 | Naik |
| 7,326,344 | B2 | 2/2008 | Cotoras Tadic et al. |
| 7,361,279 | B2 | 4/2008 | Hernandez |
| 7,439,291 | B2 | 10/2008 | Wang |
| 7,445,696 | B2 | 11/2008 | You |
| 7,470,356 | B2 | 12/2008 | You |
| 7,479,220 | B2 | 1/2009 | Cotoras Tadic et al. |
| 7,544,278 | B2 | 6/2009 | Aminabhavi et al. |
| 7,550,068 | B2 | 6/2009 | You |
| 7,559,971 | B2 | 7/2009 | Hyvarinen |
| 7,591,934 | B2 | 9/2009 | Marsden |
| 7,709,135 | B2 | 5/2010 | Shore |
| 7,736,475 | B2 | 6/2010 | Sandoval |
| 7,790,016 | B2 | 9/2010 | Ur Rahman et al. |
| 7,976,798 | B2 | 7/2011 | Otto et al. |
| 8,119,555 | B2 | 2/2012 | Banerjee et al. |
| 2001/0013471 | A1 * | 8/2001 | Hartel et al. ............... 204/522 |
| 2002/0003092 | A1 | 1/2002 | Engert |
| 2002/0096230 | A1 * | 7/2002 | Hardin et al. ............... 148/243 |
| 2002/0148769 | A1 | 10/2002 | Deuschle |
| 2003/0036001 | A1 | 2/2003 | James |
| 2004/0091410 | A1 | 5/2004 | Nakane et al. |
| 2004/0198849 | A1 | 10/2004 | Aminabhavi |
| 2005/0029087 | A1 | 2/2005 | Kamegai |
| 2005/0053818 | A1 | 3/2005 | St-Arnaud |
| 2006/0013759 | A1 | 1/2006 | Jiang |
| 2007/0056901 | A1 | 3/2007 | Wang |
| 2007/0227903 | A1 | 10/2007 | Turner et al. |
| 2008/0289955 | A1 * | 11/2008 | Balestrino et al. ............ 204/274 |
| 2009/0045150 | A1 | 2/2009 | McCutchen |
| 2009/0069176 | A1 | 3/2009 | Hernandez |
| 2010/0233767 | A1 | 9/2010 | McMurran |
| 2010/0297531 | A1 | 11/2010 | Liu |
| 2012/0070351 | A1 | 3/2012 | Braconnier et al. |

FOREIGN PATENT DOCUMENTS

| | | |
|---|---|---|
| CN | 101012499 | 8/2007 |
| CN | 101648757 | 2/2010 |
| EP | 0010984 | 5/1980 |
| EP | 0134118 | 3/1985 |
| EP | 0110033 | 12/1988 |
| WO | WO 91/01392 | 2/1991 |
| WO | WO 91/05859 | 5/1991 |
| WO | WO 92/15713 | 9/1992 |
| WO | WO 96/06134 | 2/1996 |
| WO | WO 97/12410 | 4/1997 |
| WO | WO 98/47818 | 10/1998 |
| WO | WO 00/09451 | 2/2000 |
| WO | WO 01/23627 | 4/2001 |
| WO | WO 01/66808 | 9/2001 |
| WO | WO 01/92603 | 12/2001 |
| WO | WO 02/27072 | 4/2002 |
| WO | WO 03/101593 | 12/2003 |
| WO | WO 2004/011120 | 2/2004 |
| WO | WO 2004/038071 | 5/2004 |
| WO | WO 2005/014890 | 2/2005 |
| WO | WO 2005/076919 | 8/2005 |
| WO | WO 2005/090639 | 9/2005 |
| WO | WO 2005/090644 | 9/2005 |
| WO | WO 2005/098092 | 10/2005 |
| WO | WO 2006/017022 | 2/2006 |
| WO | WO 2006/072122 | 7/2006 |
| WO | WO 2007039663 A1 * | 4/2007 |
| WO | WO 2007/146609 | 12/2007 |
| WO | WO 2008/082952 | 7/2008 |
| WO | WO 2008/082961 | 7/2008 |
| WO | WO 2008/139412 | 11/2008 |
| WO | WO 2009/000051 | 12/2008 |
| WO | WO 2009/023036 | 2/2009 |
| WO | WO 2009/124387 | 10/2009 |
| WO | WO 2010/082194 | 7/2010 |
| WO | WO 2010/103173 | 9/2010 |

OTHER PUBLICATIONS

"AMBERLITE™ Selective Resins for Brine Purification in the Chlor-Alkali Industry," Rohm and Haas Company, May 2004, pp. 1-8.

"Chlor-Alkali Membrane Cell Process," The Chemical Engineers' Resource Page, http://www.cheresources.com/chloralk.shtml, accessed Jan. 11, 2011, 2 pages.

"Chlor-alkali process," Green Facts Digests, http://www.greenfacts.org/glossary/abc/chlor-alkali-process-chlor-alkali-plant.htm, accessed Jan. 11, 2010, 2 pages.

(56) References Cited

OTHER PUBLICATIONS

"Chloralkali process," Wikipedia, the free encyclopedia, http://en.wikipedia.org/wiki/Chloralkali_process, last modified Dec. 17, 2009, 4 pages.
"Cogeneration," Wikipedia, the free encyclopedia, http://en.wikipedia.org/wiki/Cogeneration, last modified Dec. 22, 2009, 8 pages.
"The chloralkali process," http://www.out.ac.tz/avu/images/Chemistry/10_Industrial%20Chemistry/industrial_readings/chloralkali%20and%20aluminium%20electrolysis.pdf, access Dec. 17, 2010, 11 pages.
Cogeneration Technologies website, http://cogeneration.net/terms.htm, accessed Jan. 11, 2010, 5 pages.
Kirk-Othmer, "Sodium Compounds (Sodium Halides)," Kirk-Othmer Encyclopedia of Chemical Technology, Fourth Edition, vol. 22, 1997, John Wiley & Sons, p. 366.
Kroschwitz et al., eds., "Electrochemical Processing," Kirk-Othmer Encyclopedia of Chemical Technology, Fourth Edition, vol. 8, 1993, John Wiley & Sons, Inc., pp. 111-123.
Kroschwitz et al., eds., "Hydroxycarboxylic Acids," Kirk-Othmer Encyclopedia of Chemical Technology, Fourth Edition, vol. 13, 1995, John Wiley & Sons, pp. 1049-1151.
Kroschwitz et al., eds., "Lanthanides," Kirk-Othmer Encyclopedia of Chemical Technology, Fourth Edition, vol. 14, 1995, John Wiley & Sons, pp. 1091-1115.
Kroschwitz et al., eds., "Membrane Technology," Kirk-Othmer Encyclopedia of Chemical Technology, Fourth Edition, vol. 16, 1995, John Wiley & Sons, pp. 176-177.
Mazrou et al., "Regeneration of hydrochloric acid and sodium hydroxide with bipolar membrane electrodialysis from pure sodium chloride," New J. Chem., 1998, pp. 355-359.
Search Results dated Dec. 17, 2010, 102 pages.
Vandersall, Mark, "Chlor-Alkali Brine Treatment by Ion Exchange Resins," Rohm and Haas Company, 2007, pp. 1-44.
Wilhelm, "Biopolar Membrane Electrodialysis—Membrane Development and Transport Characteristics," Thesis submitted to University of Twente, 2001, 242 pages.
International Search Report for International (PCT) Patent Application No. PCT/US11/22018, mailed Mar. 23, 2011.
Written Opinion for International (PCT) Patent Application No. PCT/US11/22018, mailed Mar. 23, 2011.
Sabot et al. "Lanthanides," In Kirk-Othmer Encyclopedia of Chemical Technology, Kroschwitz et al. (eds.), 1995, John Wiley, New York, vol. 14, pp. 1091-1115.
Background of the Invention for the above-captioned invention (previously provided).
U.S. Appl. No. 13/491,419, filed Jun. 7, 2012, Burba.
International Preliminary Report on Patentability for International (PCT) Patent Application No. PCT/US11/22018, mailed Mar. 2, 2012 9 pages.
Faverjon et al. "Regeneration of hydrochloric acid and sodium hydroxide from purified sodium chloride by membrane electrolysis using a hydrogen diffusion anode-membrane assembly," Journal of Membrane Science, Nov. 2006, vol. 284, No. 1-2, pp. 323-330.
Meccucci et al. "Leaching and electrochemical recovery of copper, lead and tin from scrap printed circuit boards," Journal of Chemical Technology and Biotechnology, Apr. 2002, vol. 77, No. 4, pp. 449-457.
Official Action for Australia Patent Application No. 2011207307, dated Feb. 12, 2014 3 pages.
Official Action with English Translation for China Patent Application No. 201180015472.9, mailed Aug. 26, 2013 10 pages.
Extended Search Report for European Patent Application No. 11735221.1, dated Apr. 22, 2014, 9 pages.
Official Action with English Translation for China Patent Application No. 201180015472.9, dated Jun. 19, 2014 22 pages.
Official Action for ARIPO Application No. AP/P/2012/006439, mailed Sep. 26, 2014, 6 pages.
Official Action with English Translation for China Patent Application No. 201180015472.9, dated Nov. 15, 2014 14 pages.
Official Action (with partial English translation) for Eurasia Patent Application No. 201201035, Nov. 15, 2014 2 pages.

* cited by examiner

HYDROMETALLURGICAL PROCESS AND METHOD FOR RECOVERING METALS

CROSS REFERENCE TO RELATED APPLICATION

The present application claims the benefits of U.S. Provisional Application Ser. Nos. 61/297,536, filed Jan. 22, 2010; 61/427,745, filed Dec. 28, 2010, and 61/432,075, filed Jan. 12, 2011, all having the same title, each of which is incorporated herein by this reference in their entirety.

FIELD

This disclosure relates generally to mineral processing plants and facilities and particularly to hydrometallurgical plants and facilities for recovering metals.

BACKGROUND

A common method of recovering valuable metals from ores and concentrates is by leaching with a mineral acid. By way of example, rare earth metals are generally recovered from bastnaesite by leaching the host rock with hydrochloric acid. Uranium can be recovered from uranium-containing host rock by leaching with phosphoric acid. Copper, beryllium, nickel, iron, lead, molybdenum, aluminum, and manganese can be recovered from host rock by leaching with nitric acid. Copper, beryllium, nickel, iron, lead, molybdenum, aluminum, germanium, uranium, gold, silver, cobalt, and manganese can be recovered from host rock by leaching with sulfuric acid or hydrochloric acid.

While leaching is effective in dissolving valuable metals, a number of obstacles are encountered. Hydrometallurgical processes require water. Water may be available only in limited quantities. The available water is often saline. Furthermore, any process water generated must be suitable for disposal. Typically, the process water is disposed of using evaporation ponds, which can be expensive to construct and deleterious to the environment. Evaporation ponds have particularly long term environmental footprints. Furthermore, the leaching process requires electrical energy. Electrical energy can be difficult or expensive to obtain, particularly when the deposit is in a remote location. This generally requires the mine operator to construct, at high capital and operating costs, adequate power generation facilities.

SUMMARY

These and other needs can be addressed by the various aspects, embodiments, and configurations disclosed herein.

In one embodiment, a process is disclosed for recovering a valuable metal from a valuable metal-containing material using a mineral acid produced by an electrochemical acid generation process, such as a chloralkali cell or bipolar membrane electrodialysis system.

In one configuration, the process includes the steps:

(a) contacting a valuable metal-containing material with a leaching solution to form a pregnant leach solution comprising a dissolved valuable metal;

(b) recovering the dissolved valuable metal to form a valuable metal product and a byproduct salt solution, wherein typically at least most of the byproduct salt solution is derived from a reaction of an acid with a base in one or both of the contacting and recovering steps;

(c) converting, by one or more of a chloralkali and bipolar membrane electrodialysis cell, the byproduct salt solution into the acid and base; and (d) recycling at least most of the acid and base to the contacting and/or recovering steps.

Commonly, at least most of the byproduct salt solution is converted into acid and base, and at least most of the acid and base are recycled.

In one application, the acid is a component of the leaching solution, the valuable metal is a rare earth, the acid component is hydrochloric acid, the salt in the byproduct salt solution is one or more of sodium chloride and potassium chloride, the base is one or more of sodium hydroxide and potassium hydroxide, and the valuable metal product is a rare earth oxide.

In another application, the acid is a component of the leaching solution, the bipolar membrane electrodialysis cell is employed, the valuable metal is one or more of copper, beryllium, nickel, iron, lead, molybdenum, and manganese, the acid component is nitric acid, the salt in the byproduct salt solution is one or more of sodium nitrate and potassium nitrate, and the base is one or more of sodium and potassium hydroxide.

In another application, the acid is a component of the leaching solution, the bipolar membrane electrodialysis cell is employed, the valuable metal is uranium, the acid component is phosphoric acid, the salt in the byproduct salt solution is one or more of sodium phosphate and potassium phosphate, and the base is one or more of sodium and potassium hydroxide.

In yet another application, the acid is a component of the leaching solution, the bipolar membrane electrodialysis cell is employed, the valuable metal is one or more of a platinum group metal, copper, beryllium, nickel, iron, lead, molybdenum, aluminum, germanium, uranium, gold, silver, cobalt, zinc, cobalt, tin, titanium, chromium, and manganese, the salt in the byproduct salt solution is one or more of sodium sulfate and potassium sulfate, the acid component is (hydro)sulfuric acid, and the base is one or more of sodium and potassium hydroxide.

In yet another application, the acid is a component of the leaching solution, the valuable metal is one or more of yttrium, scandium, a lanthanide, a platinum group metal, copper, chromium, beryllium, nickel, iron, lead, molybdenum, aluminum, germanium, uranium, gold, silver, cobalt, zinc, cobalt, tin, titanium, and manganese, the salt in the byproduct salt solution is one or more of sodium chloride and potassium chloride, the acid component is hydrochloric acid, and the base is one or more of sodium and potassium hydroxide.

The process configuration(s) can include purification of the byproduct salt solution upstream of the electrochemical acid generation plant. In one example, at least most of a selected polyvalent impurity is removed from the byproduct salt solution to form a purified salt solution. The selected polyvalent impurity is commonly a cation that is removed from the byproduct salt solution by precipitation induced by a pH change from contact of the base with the byproduct salt solution. In another example, the impurity to be removed is an organic, which may originate in the feed material and/or result from the use of organic reagents in the process.

The process configuration(s) can also include concentration of the purified salt solution by a salt concentrator to form a concentrated and purified salt solution followed by introduction of the concentrated and purified solution and, optionally a mineral acid, into an anolyte recirculation tank. The salt solution is withdrawn from the tank and provided to the electrochemical acid generation plant.

To produce hydrochloric acid efficiently, an approximate stoichiometric balance is typically maintained between chlorine and hydrogen gas produced in the converting step.

The process is particularly applicable to a metal recovery operation in which an acid and base are reacted to produce a salt byproduct solution. The salt byproduct solution is regenerated electrochemically to the acid and base components, which are then reused in the process.

In another embodiment, a cogen plant is used to provide waste heat and electrical energy to the appropriate process steps in a metal recovery process.

The embodiments, aspects, and configurations can provide a number of advantages depending on the particular configuration. First, the process can be used to dispose economically of waste brine solutions from terrestrial acquifers and/or generated by industrial processes. The electrochemical acid generation plant converts waste salt (e.g., sodium chloride) water, such as from evaporation ponds and terrestrial acquifers, to a mineral acid (e.g., hydrochloric acid) and other valuable products, such as sodium hydroxide and sodium hypochlorite. The mineral acid and other valuable products can be used in the industrial process (e.g., hydrometallurgical valuable metal recovery process) and/or sold. The material recycle can reduce greatly acid and caustic reagent requirements. The cogen plant can provide power and heat to the acid generation plant. This combination can create a positive environmental impact. In one example, 936,000 lb/year of water and 104,000,000 lb of salt are recycled back to a mineral processing plant. This methodology can avoid the need for waste water ponds that represent long term environmental footprints while reducing operating costs. For example, reagent costs and haulage requirements can be reduced significantly. Because the water is internally recycled, the need for fresh water can be reduced dramatically.

These and other advantages will be apparent from this disclosure.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. The terms "comprising", "including", and "having" can be used interchangeably.

"Absorption" is the incorporation of a substance in one state into another of a different state (e.g. liquids being absorbed by a solid or gases being absorbed by a liquid). Absorption is a physical or chemical phenomenon or a process in which atoms, molecules, or ions enter some bulk phase—gas, liquid or solid material. This is a different process from adsorption, since molecules undergoing absorption are taken up by the volume, not by the surface (as in the case for adsorption).

"Adsorption" is the adhesion of atoms, ions, biomolecules, or molecules of gas, liquid, or dissolved solids to a surface. This process creates a film of the adsorbate (the molecules or atoms being accumulated) on the surface of the adsorbent. It differs from absorption, in which a fluid permeates or is dissolved by a liquid or solid. Similar to surface tension, adsorption is generally a consequence of surface energy. The exact nature of the bonding depends on the details of the species involved, but the adsorption process is generally classified as physisorption (characteristic of weak van der Waals forces)) or chemisorption (characteristic of covalent bonding). It may also occur due to electrostatic attraction.

A "mill" refers to any facility or set of facilities that process a metal-containing material, typically by recovering, or substantially isolating, a metal or metal-containing mineral from a feed material. Generally, the mill includes an open or closed comminution circuit, which includes crushers or autogenous, semi-autogenous, or non-autogenous grinding mills.

A "mineral acid" is an inorganic acid, such as sulfuric acid, nitric acid, or hydrochloric acid.

A "rare earth" refers to any of a large class of chemical elements, including scandium (atomic number 21), yttrium (39), and the 15 elements from 57 (lanthanum) to 71 (lutetium) (known as the lanthanides).

A "salt" is an ionic compound that results from the neutralization reaction of an acid and a base. Salts are composed of cations (positively charged ions) and anions (negative ions) so that the product is electrically neutral (without a net charge). These component ions can be inorganic such as chloride ($Cl^-$), as well as organic such as acetate ($CH_3COO^-$) and monatomic ions such as fluoride ($F^-$), as well as polyatomic ions such as sulfate ($SO_4^{2-}$). Salts that hydrolyze to produce hydroxide ions when dissolved in water are basic salts and salts that hydrolyze to produce hydronium ions in water are acid salts. Neutral salts are those that are neither acid nor basic salts.

A "sorbent" is a material that sorbs another substance; that is, the material has the capacity or tendency to take it up by sorption.

"Sorb" means to take up a liquid or a gas either by sorption.

"Sorption" refers to adsorption and absorption, while desorption is the reverse of adsorption.

The preceding is a simplified summary to provide an understanding of some aspects of the aspects, embodiments and configurations disclosed herein. This summary is neither an extensive nor exhaustive overview of the aspects, embodiments, or configurations. It is intended neither to identify key or critical elements nor to delineate the scope of the aspects, embodiments, or configurations but to present selected concepts in a simplified form as an introduction to the more detailed description presented below. As will be appreciated, other aspects, embodiments, and configurations are possible utilizing, alone or in combination, one or more of the features set forth above or described in detail below.

BRIEF DESCRIPTION OF THE DRAWINGS

The accompanying drawings are incorporated into and form a part of the specification to illustrate examples of the aspects, embodiments, or configurations disclosed herein. These drawings together with the description, explain the principle of the aspects, embodiments, or configurations. The drawings simply illustrate preferred and alternative examples of how the aspects, embodiments, or configurations can be made and used and are not to be construed as limiting the aspects, embodiments, or configurations to only the illustrated and described examples. Further features and advantages will become apparent from the following, more detailed, description of the various aspects, embodiments, or configurations, as illustrated by the drawings referenced below.

DETAILED DESCRIPTION

Figure 1:
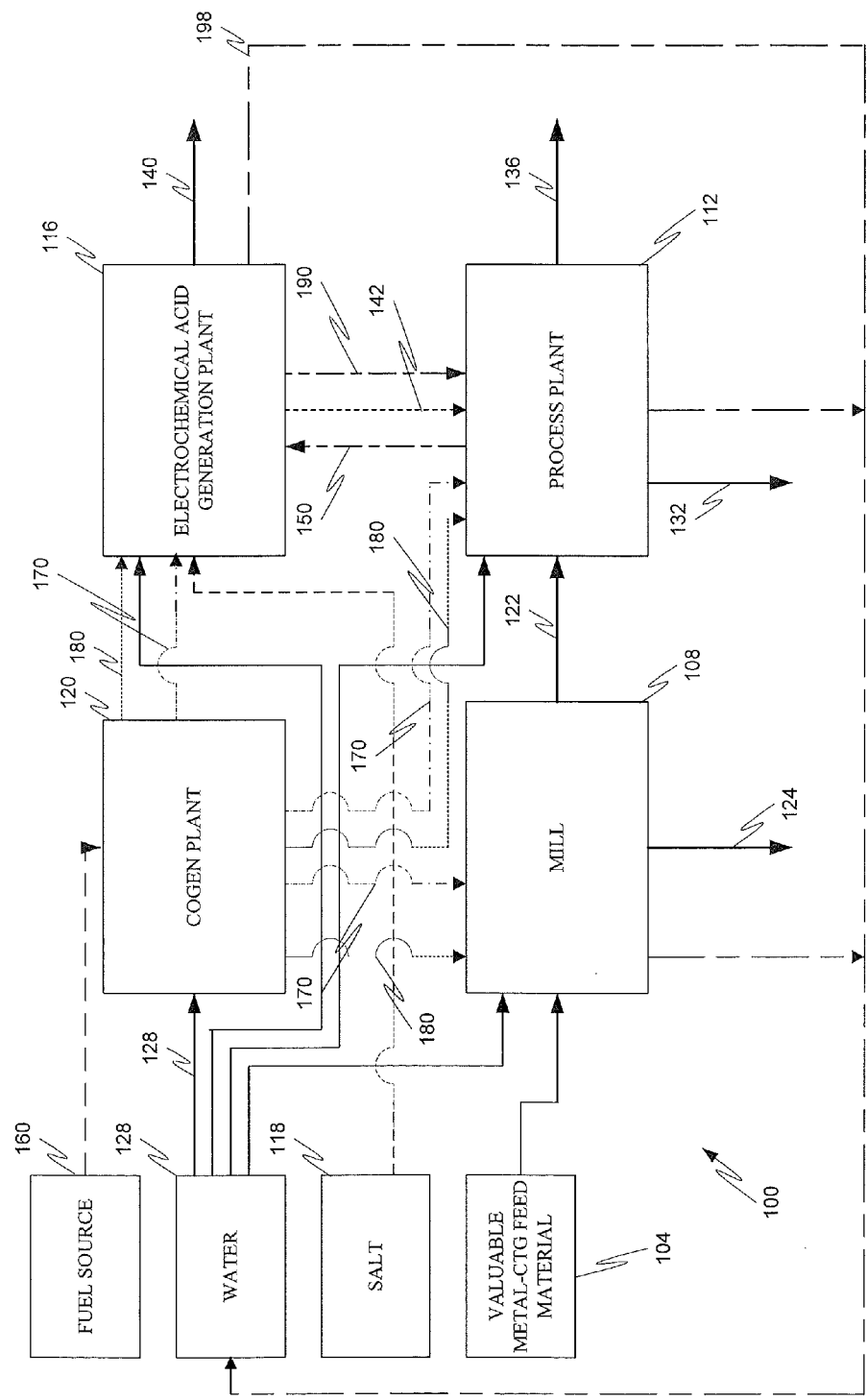
FIG. 1 is a block diagram depicting a plant according to an embodiment.

A first embodiment is an industrial plant 100 for processing a feed material 104. The industrial plant 100 first will be discussed with reference to FIG. 1. The industrial plant 100 includes a mill 108, a process plant 112, an electrochemical acid generation plant 116, and a cogen plant 120. The industrial plant 100 processes a valuable metal-containing feed material 104.

The valuable metal-containing feed material 104 may comprise a mined ore, concentrate, tailings, metallurgical residue or a mixture thereof. Commonly, the valuable metal-containing feed material 104 comprises an acid soluble metal. Referring to the Periodic Table of the Elements, the valuable metal is typically a transition metal, other metal, actinide metal, or rare earth metal (e.g., lanthanide). The metal may qualify as a light or heavy metal. Specific examples of valuable metals include antimony, uranium, lanthanides, copper, beryllium, nickel, iron, lead, molybdenum, aluminum, germanium, uranium, titanium, chromium, gold, silver, cobalt, tin, zinc, cadmium, manganese, and the platinum group metals. The metal in the valuable metal-containing material 104 is typically in the form of an igneous (whether abyssal, plutonic, hypabyssal, or extrusive or effusive), metamorphic (whether of ignous or sedimentary origin), or sedimentary (whether clastic sediments or chemical precipitates) mineral, such as a sulfide, oxide, phosphate, carbonate, halide, sulfate, silicate, telluride, oxysalt, sulfosalt, and mixtures thereof. Exemplary rare earth-containing minerals include bastnaesite (a carbonate-fluoride mineral) and monazite. Other rare earth-containing minerals include aeschynite, allanite, apatite, britholite, brockite, cerite, fluorcerite, fluorite, gadolinite, parisite, stillwellite, synchisite, titanite, xenotime, zircon, and zirconolite. Exemplary uranium minerals include uraninite ($UO_2$), pitchblende (a mixed oxide, usually $U_3O_8$), brannerite (a complex oxide of uranium, rare-earths, iron and titanium), coffinite (uranium silicate), carnotite, autunite, davidite, gummite, torbernite and uranophane. Exemplary copper minerals include cuprite, chalcolate, covelite, bornite, malachite, azurite, chryscolla, and chalcopyrite. Exemplary nickel minerals include millerite and smaltite. Exemplary cobalt minerals include arsenide $Co(As_2)$, known as smaltite or speiss cobalt; cobalt sulfarsenide (CoAsS), known as cobaltite or cobalt glance; and hydrated arsenate $(Co(AsO_4)_2 \cdot 8H_2O)$, known as erythrite or cobalt bloom. Exemplary molybdenum minerals include molybdenite ($MoS_2$) and wulfenite ($PbMoO_4$). As will be appreciated and noted above, valuable metals are included in a large variety of other minerals known to those of skill in the art. As will be further appreciated, the valuable metal-containing feed material 104 may include a mixture of minerals of different metals and/or a mixture of valuable metal-containing minerals, invaluable metal-containing minerals, and/or nonmetal-containing minerals.

The valuable metal-containing feed material 104 is introduced into the mill 108 to produce a milled material 122 and waste material 124. Depending on the valuable metal-containing feed material 104, the mill 108 may have any of a number of differing configurations.

In one configuration, the mill 108 includes a wet (using water 128) and/or dry comminution circuit to reduce an average or median size of the incoming valuable metal-containing feed material 104, one or more conditioning vessels to condition the comminuted feed material for subsequent processing, and a direct or reverse flotation circuit to isolate in a concentrate or tailings fraction, respectively, the metal-containing mineral(s). The flotation circuit may operate at an elevated temperature (relative to the ambient temperature and/or temperature of the comminuted feed material). The mill 108 can have, or include, other concentration devices or mechanisms, such as gravity or specific gravity separation mechanisms (e.g., decantation circuits, cyclones, hydraulic classifiers, mechanical classifiers, settling tanks, and the like), size separation mechanisms (e.g., stationary and vibrating screens, filters, grizzlies, trommels, and the like), magnetic separation mechanisms, and color separation mechanisms. The mill 108 can include other components, including dryers, slurry vessels, mixing or conditioning vessels, pumps, thickeners, conveyors, screw feeders, agitators, and the like. Water 128 is used to slurry the feed material for subsequent processing.

The process plant 112 converts the milled material 122 into a metal-containing product 136 and a byproduct or waste product 132. Depending on the milled material 122, the process plant 112, like the mill 108, can have any of a number of differing configurations.

In one configuration, the process plant 112 includes an oxidative or non-oxidative leaching circuit, which may be an atmospheric or super-atmospheric heap, vat, and/or tank leach, conducted at an ambient or elevated temperature, in which a lixiviant is applied to the milled material 122 to leach and/or dissolve, chemically and/or biologically, at least most of one or more of the valuable metals from the milled material 122, leaving behind the byproduct and/or waste 132. The byproduct material 132 may comprise a barren valuable metal-containing material. The lixiviant may, or alternatively, also be used to overcome the inhibitory effect of sulfides, carbonates, oxides, phosphates, halides, silicates, and the like contained with some valuable metal-containing materials 104.

The composition of the lixiviant depends on the composition of the valuable metal-containing material 104. Typical lixiviants are mineral acids, such as sulfuric acid, nitric acid, phosphoric acid, hydrobromic acid, hydrochloric acid, hydroiodic acid, hydrofluoric acid, and mixtures thereof. The lixiviant may include other inorganic and organic acids. Once dissolved, the valuable metal is isolated from impurities, such iron, by a suitable recovery technique, such as precipitation, (cationic and/or anionic) ion exchange (e.g., by a resin or solvent), sorption (e.g., carbon-in-leach and resin-in-leach), solvent extraction, electrochemistry (e.g., electrowinning), calcination, roasting, smelting, amalgamation, cementation, gravimetry, other types of refining, and combinations thereof. The process plant 112 may include other components, including dryers, slurry vessels, mixing vessels, conditioning vessels, pumps, thickeners, conveyors, filters, screw feeders, agitators, and the like. As will be appreciated, mineral acids and salts can also be used to as a stripping agent for removing a valuable metal from an ion exchange media (e.g., resins or solvent) or a sorbent and/or as an electrolyte in electrowinning.

In one configuration of the process plant 112, caustic soda (NaOH) is used in solvent extraction to provide sodium ions to the ion exchange resin. Rare earth metal ions replace the sodium ions on the ion exchange resin. The rare earth metal ions are stripped from the resin by hydrochloric acid for subsequent recovery by techniques known to those of skill in the art of extractive metallurgy.

The industrial plant 100 further includes the electrochemical acid generation plant 116. Commonly, the electrochemical acid generation plant 116 produces from a salt 118 at least most of one or more of the lixiviant, stripping agent and/or electrolyte used by the process plant 112. The electrochemical acid generation plant 116 electrolyzes a halogen-containing alkali metal salt to produce an elemental form of the halogen and an alkali metal hydroxide. The electrochemical acid generation plant 116 can have differing configurations and commonly includes one of a chloralkali electrolysis process, a salt splitting electrolytic process or an bipolar membrane electrodialysis process, or a combination thereof.

As will be appreciated, the chloralkali process can be configured as a membrane electrolysis cell, diaphragm electrolysis cell, or mercury (e.g., Castner-Kellner process) electrolysis cell. Because of environmental problems associated with mercury, the preferred cell type is the membrane cell.

In the membrane cell, the chloralkali process electrolyzes, in the anodic compartment, a saturated or substantially saturated halogen-containing (commonly alkali metal-containing) salt (e.g., a chlorine containing salt) to produce an elemental form of the halogen (e.g., chlorine gas) and a salt cation (e.g., alkali-metal) hydroxide. Commonly, the hydroxide comprises caustic soda, (e.g., sodium hydroxide). An anode and cathode are electrically interconnected and an electric potential is applied to the anode and cathode by the cogen plant 120 and electric current flows between the anode and cathode. At the anode, chloride ions are oxidized to chlorine:

  (1)

At the cathode, hydrogen in the water is reduced to hydrogen gas, releasing hydroxide ions to the solution:

  (2)

The chloralkali process includes an ion permeable membrane separating the anodic and cathodic compartments. To maintain charge balance between the anodic and cathodic compartments, the cations (e.g., Na$^+$ or K$^+$) pass from anodic compartment through the ion permeable membrane to the cathodic compartment, where they react with hydroxide ions to produce, for example, caustic soda (NaOH). At least most of the halogen anions (such as chloride anions) and other anions (such as hydroxide ions) are not passed by the membrane and maintained within the anodic compartment. Assuming that the brine is NaCl, the overall reaction for the electrolysis of the brine is thus:

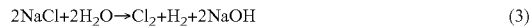  (3)

In the case of potassium chloride as the salt 118, electrolysis of the salt produces chlorine gas in the anodic compartment and potassium hydroxide in the cathodic compartment.

The membrane prevents reaction between the chlorine and hydroxide ions. If the reaction were to occur, the chlorine would be disproportionated to form chloride and hypochlorite ions:

  (4)

Above about 60° C., chlorate can be formed:

  (5)

If the chlorine gas produced at the anode and sodium hydroxide produced at the cathode were to be combined, sodium hypochlorite (NaClO) (see equation 6 below) and/or sodium chlorate (NaClO$_3$) would be produced.

In the diaphragm cell, anodic and cathodic compartments are separated by an ion permeable diaphragm. Brine is introduced into the anode compartment and flows into the cathode compartment. Like the membrane cell, halogen ions are oxidized at the anode to produce elemental halogens, and, at the cathode, water is split, for example, into caustic soda and hydrogen. The diaphragm prevents the reaction of the caustic soda with the halogen. A diluted caustic brine leaves the cell. The caustic soda typically is concentrated to about 50%, and the salt is removed. This can be done using an evaporative process (discussed below). The halogen commonly contains molecular oxygen that can be removed by liquefaction and evaporation.

The ion-exchange membrane can be any cation- or anion-ion permeable membrane or bipolar membrane, commonly an ion membrane substantially stable in the presence of hydroxide anions. More commonly, the ion membrane is permeable to alkali ions and substantially impermeable to hydroxide and/or halide anions. The ion permeable membrane can comprise a fluoropolymer having one or more pendant sulfonic acid groups, a composite of fluoropolymers having one or more sulfonic acid groups, and a fluoropolymer having one or more carboxylic acid groups, phosphoric acid groups, and/or a sulfonamide groups and fluorinated membranes. An exemplary membrane is Nafion™ produced by DuPont, which passes substantially cations but substantially repels neutrals and anions.

The diaphragm can be any suitable ion permeable material. Typically, the diaphragm is an ion permeable membrane made from asbestos.

It can be appreciated that, while the chloralkali process has been discussed in terms of alkali cations, having a +1 charge, the process can include cations other than alkali cations. The other cations can have a +2, +3 or +4 charge. The ionic membrane can be configured to be permeable to the other cations and/or to pass cations having a selected ionic and/or hydrodynamic radius.

A number of products can be formed. Using sodium chloride as an exemplary brine solution:

$$Cl_2 + 2NaOH \rightarrow 2NaClO_{(bleach)} \quad (6)$$

$$Cl_2 + H_2 \rightarrow 2HCl_{(g)} \quad (7)$$

$$HCl_{(g)} + H_2O \rightarrow HCl_{(aq)} \quad (8)$$

Equation 7 is catalyzed by an alkaline earth metal, typically calcium.

These equations apply to KCl as the salt, if K is substituted for Na.

These equations also apply to halogens other than chlorine provided suitable changes are made for differences in oxidation states.

In another embodiment, the ionic membrane can comprise an bipolar membrane electrodialysis membrane process. Commonly, the bipolar membrane electrodialysis process is conducted in an bipolar membrane electrodialysis cell having a feed (diluate) compartment, such as the cathodic compartment, and a concentrate (brine) compartment, such as the anodic compartment, separated by one or more anion exchange membranes and one or more cation exchange membranes placed between the anodic and a cathodic compartments. In most bipolar membrane electrodialysis processes, multiple bipolar membrane electrodialysis cells are arranged into a configuration called an bipolar membrane electrodialysis stack, with alternating anion and cation exchange membranes forming the multiple bipolar membrane electrodialysis stacks. Bipolar membrane electrodialysis processes are unique compared to distillation techniques and other membrane-based processes (such as reverse osmosis) in that dissolved species are moved away from the feed stream rather than the reverse.

A bipolar membrane electrodialysis, or "water splitting", process, converts aqueous salt solutions into acids and bases, typically without chemical addition, avoiding by-product or waste streams and costly downstream purification steps. Under the force of an electrical field, a bipolar membrane can dissociate water into hydrogen (H+, in fact "hydronium" H3O+) and hydroxyl (OH—) ions. The membrane is formed of anion- and cation-exchange layers and a thin interface where the water diffuses from outside aqueous salt solutions. The transport, out of the bipolar membrane, of the H+ and OH— ions obtained from the water splitting reaction is possible if the bipolar membrane is electrically oriented correctly. With the anion-exchange side facing the anode and the cation-exchange side facing the cathode, the hydroxyl anions are transported across the anion-exchange layer and the hydrogen cations across the cation-exchange layer. The generated hydroxyl and hydrogen ions are used in an electrodialysis stack to combine with the cations and anions of the salt to produce acids and bases.

Bipolar membrane electrolydialysis can use many different cell configurations. For example, a three-compartment cell is formed by locating the bipolar membrane in a conventional electrodialysis cell. The bipolar membrane is flanked on either side by the anion- and cation-exchange membranes to form three compartments, namely acid between the bipolar and the anion-exchange membranes, base between the bipolar and the cation-exchange membranes, and salt between the cation- and anion-exchange membranes. As in electrodialysis stacks, many cells can be installed in one stack and a system of manifolds feeds all the corresponding compartments in parallel, creating three circuits across the stack: acid, base, and salt. Other configurations include two-compartment cells with bipolar and cation-exchange membranes (only) or with bipolar and anion-exchange membranes.

As will be appreciated, the electrochemical acid generation plant 116 can include an bipolar membrane electrodialysis process conducted prior to and/or after the chloralkali process. The bipolar membrane electrodialysis process further purifies the aqueous streams produced by the respective anodic and cathodic compartments.

Commonly at least most of the mineral acid 142 and hydroxide 190 used in the process plant, such as for a lixiviant, stripping or regeneration agent, or electrolyte, is produced by the electrochemical acid generation plant 116 from a suitable salt. By way of example, hydrochloric acid is produced from an alkali metal chloride by burning chlorine gas from the anode compartment and hydrogen gas from the cathode compartment, typically in the presence of a suitable catalyst (see equation 7 above). Hydrosulfuric or sulfuric acid is produced, using salt splitting or bipolar membrane electrodialysis techniques, from an alkali metal sulfate. In other examples, nitric acid is produced from an alkali metal nitrate, phosphoric acid is produced from an akali metal phosphate, hydrobromic acid from alkali metal bromides, hydroiodic acid from alkali metal iodides, and hydrofluoric acid from alkali metal fluorides.

The electrochemical acid generation plant 116 can also produce products 140 for sale and water 198 for recycle. Examples of such products include hydrogen gas, a halogen gas (such as chlorine gas, bromine gas, iodine gas, and the like), caustic soda, bleach (such as hypochlorite) and the like.

In one configuration, the salt-containing solution 150 is outputted by the process plant 112. The salt-containing solution 150 can, for example, be produced by one or more of the leaching, solvent extraction and electrowinning process(es). In one process plant configuration 12, caustic soda is used in solvent extraction to provide sodium ions to the ion exchange resin. Valuable metal ions replace the sodium ions on the ion exchange resin. The valuable metal ions are stripped from the resin by hydrochloric acid for subsequent recovery by techniques known to those of skill in the art of extractive metallurgy.

In the electrochemical acid generation plant, the salt-containing solution 150 is subjected to chemical treatment, in a primary purification system, using caustic soda (or cell liquor from the cathode compartment of the plant 116), sodium carbonate, and/or other additives that eliminate at least most of any polyvalent metal ion impurities, such as calcium, magnesium, and iron. Such polyvalent cations can detrimentally impact the performance and operational life of the ion exchange membrane and/or bipolar membrane electrodialysis stack. One or both of a thickener and filter commonly remove the polyvalent impurities.

The treated salt-containing solution is then passed through a secondary purification system to remove most of any remaining polyvalent cations. Caustic soda may be used to adjust the pH to above about pH 7 prior to introduction into the secondary purification system. Any conventional secondary brine purification treatment system associated with membrane operations may be used, such as a chelating ion exchange resin. Phosphate treatment of the brine may also be used. Phosphates can form a gel coat in the membrane in a way that better maintains membrane efficiency. The purified salt-containing solution is then processed by a salt concentrator, such as an evaporator, energy efficient vapor recompressor, or combination thereof. Proper design of these units with proper use of heat recuperators and elutriation legs has been determined to be energy efficient and the required slurry concentrations easy to control without the need to centrifuge and separate the solid salt from the slurry. The slurry is then introduced into an anolyte recirculation tank, to which a mineral acid, such as hydrochloric acid (produced from chlorine and hydrogen gases), can be introduced. From the anolyte recirculation tank, the slurry is introduced into the anode compartment. This process is not required where the chloralkali cell uses a diaphragm rather than a membrane.

Turning now to the cogen plant 120, the cogen plant 120 uses any suitable fuel source 160 to generate power 170 and waste heat 180 (e.g., steam). The power 170 is used in unit operations in one or more of the mill 108, process plant 112, and electrochemical acid generation plant 116. As will be appreciated, "cogen" or cogeneration uses a heat engine or a power station to simultaneously generate both electricity and useful heat. Although any cogeneration plant may be used, common cogen plants include gas turbine cogen plants using the waste heat in the flue gas of gas turbines, gas engine cogen plants using a reciprocating gas engine, combined cycle power plants adapted for cogeneration, steam turbine cogen plants using the heating system as the steam condenser for the steam turbine, and molten-carbonate fuel cells having a hot exhaust that is suitable for heating. Smaller cogen plants typically use a reciprocating or Stirling engine. The heat is removed from the exhaust and the radiator.

The fuel source 160 can be any suitable combustion fuel source, including compressed or liquefied natural gas, coal, methane, petroleum, liquefied petroleum gas, diesel fuel, kerosene, coal, propane, other fossil fuels, radioactive materials (e.g., uranium), and alternative fuel sources, such as biodiesel, bioalcohol (methanol, ethanol, and butanol), hydrogen, HCNG, liquid nitrogen, compressed air, non-fossil methane, non-fossil natural gas, vegetable oil, and biomass sources.

The waste heat 180 can be directly provided to one or more of the unit operations, such as flotation, leaching, and the like, by means of a heat exchange loop, which circulates the waste heat 180 from the cogen plant 120 through a heat exchange loop in thermal contact with the material in the unit operation to be heated. Alternatively, an intermediate heat exchange medium can collect the waste heat 180, by means of a first heat exchange loop, from the waste heat 180 and provide the thermal energy to the material to be heated by means of a second heat exchange loop.

The operation of the industrial plant 100 will now be discussed with respect to several illustrative embodiments.

With reference to FIG. 1, the valuable metal-containing feed material 104 is introduced into the mill 108 to yield a milled material 122. In one process configuration, the feed material 104 comprises one or more rare earth-containing minerals, which are crushed and ground. The ground material is subjected to direct flotation, at elevated temperature (which can be in the range of about 30 to about 70° C.) and using suitable frothers, collectors, activators, and/or depressants known to those of ordinary skill in the art, to produce a concentrate (or milled material 120) comprising at least most of the rare earth minerals and tailings. The tailings are commonly suitable for disposal and substantially depleted of the rare earths.

The cogen plant 120 provides power to the comminution and flotation cell agitators and waste heat 180, typically in the form of steam, to the slurried milled material prior to the flotation operation.

The milled material 122, or concentrate fraction, is provided to the process plant 112 for further processing.

In a common process configuration for valuable metal recovery, milled material 122 is subjected to vat or heap leaching by a mineral acid, commonly by an aqueous hydrochloric acid solution, to dissolve the valuable metal and form a pregnant leach solution comprising most of the valuable metal in the concentrate fraction. The pregnant leach solution is subjected to solvent extraction or ion exchange to remove at least most of the dissolved valuable metal from the solution and form a loaded resin containing the removed valuable metal and a barren leach solution for recycle to the leaching operation. The loaded resin is contacted with a stripping solution to dissolve at least most of the removed valuable metal, forming a barren resin for recycle to the solvent extraction step and a loaded stripping solution containing at least most of the valuable metal. The dissolved valuable metals are separated from the loaded stripping solution, such as by precipitation, further solvent extraction, or phase transfer extraction (such as, with a nitrogen-containing phase transfer agent), to form a barren stripping solution for recycle to the solvent extraction step and a separated valuable metal-containing material.

The cogen plant 120 provides power 170 to the pumps and other process equipment in the process plant 112 and waste heat 180, as needed, to the appropriate unit operations. In one configuration, the lixiviant and/or stripping solution include hydrochloric acid, and the above unit operations in the process plant 112 produce a byproduct salt solution, which, in some applications, is an acidic brine solution. As noted, this solution can be recycled to the primary and secondary treatment circuits for purification prior to introduction to the electrochemical acid generation unit to generate more acid 142 and other products 140. The primary and secondary treatment circuits treat the byproduct salt solution, as noted above, to remove at least most of the polyvalent cations before introducing the treated or purified byproduct salt solution to the electrochemical acid generation unit.

In the electrochemical acid generation plant 116, the byproduct salt solution is converted, as noted above, into caustic soda, sodium hypochlorite, hydrogen gas, and chlorine gas. The hydrogen gas and chlorine gas are thermally reacted to produce hydrochloric acid 142 for recycle to the process plant 112. Because a portion of the hydrogen gas is lost and a substantial stoichiometric imbalance (see equations 1-6 above) exists between hydrogen gas and chlorine gas, a portion of the chlorine gas can be used to manufacture bleach for sale. Alternatively, the chlorine gas can be sold for other applications, such as the manufacture of chlorinated solvents or chlorinated organics. In this manner, an approximate stoichiometric balance between hydrogen and chlorine gas is maintained in the process. The cogen plant 120 provides power 170 and waste heat 180 (typically in the form of steam) to the appropriate unit operations in the electrochemical acid generation plant 116. Byproduct water 128 from the plant 116 is recycled to the cogen plant 120, mill 108, and process plant 112.

Figure 2:
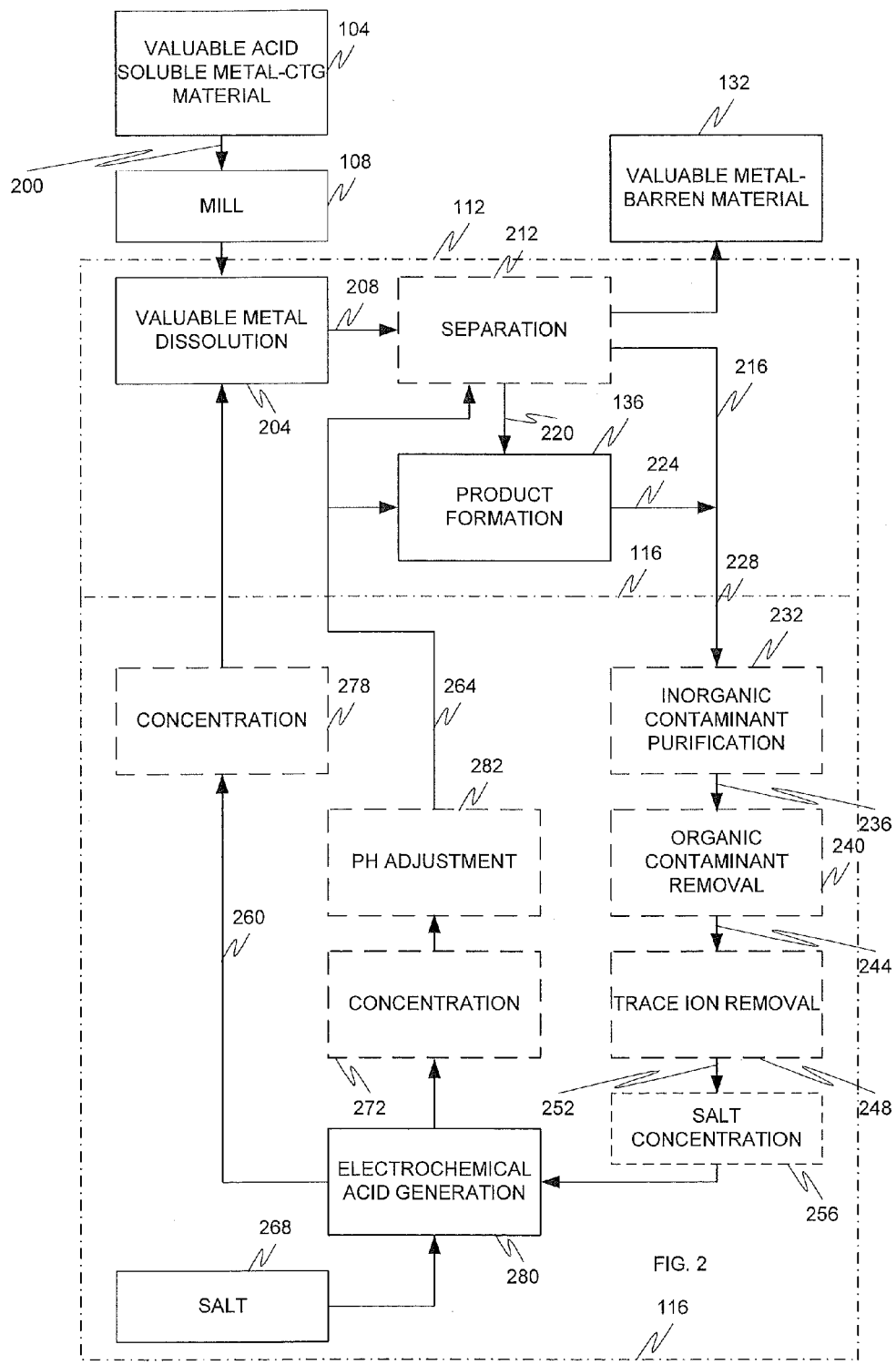
FIG. 2 is a block diagram depicting a plant according to an embodiment.

With reference to FIG. 2, a second embodiment will now be discussed.

The valuable (acid soluble) metal-containing material 104 is milled in the mill 108. In the mill, the material 104 is comminuted, by wet and/or dry crushers and grinding mills in an open or closed circuit, to produce a comminuted material (not shown). The comminuted material is commonly concentrated, such as by flotation or size or weight separation techniques, to produce a concentrate 200, which commonly is in the form of a slurry.

The concentrate (slurry) 200 is introduced into the process plant 112. In the process plant 112, the concentrate 220 is vat or heap leached (step 204), biologically and/or chemically, by a leach solution (not shown) comprising a mineral acid to dissolve at least most of the valuable metal in the leach solution to form a pregnant leach solution 208. The pregnant leach solution 208 is optionally separated (step 212) to produce a valuable metal-barren material 132, a valuable metal-barren salt solution 216, and a valuable metal-rich solution 220. The valuable metal-rich solution 220 includes at least most of the dissolved valuable metal in the pregnant leach solution.

In one configuration, the separation includes a thickener/wash circuit, such as a counter current decantation circuit, to remove the solid-phase valuable metal-barren material 132 from the valuable metal-rich liquid phase (not shown). As will be appreciated, other liquid/solid separation techniques may be employed, such as filtration, screening, cyclones, and other size or weight separation techniques.

The valuable metal-rich liquid phase is then subjected to sorption (such as using an ion exchange or chelating resin) or membrane filtration to remove at least most of the valuable metal from the liquid phase and form a valuable metal-barren leach solution for recycle to the valuable metal dissolution step 204. The sorbent can be an ion exchange or chelating resin, a porous media (e.g., activated carbon, zeolites, and other porous media), and the like. While sorption and membrane separation are discussed with reference to the removal of a selected or target valuable metal, it is to be understood that sorption and/or membrane separation may also be used, in addition to or in lieu of valuable target metal sorption, in separation 212 to remove impurities, such as other valuable or invaluable metals, thereby purifying the target valuable metal-containing pregnant leach solution.

The sorbed target valuable metal is stripped from the sorbent (not shown) by a stripping solution (such as an eluant) by a change (relative to the pregnant leach solution) in temperature and/or pH (which changes the preference for the sorbent of the target valuable metal) to form a target valuable metal-rich stripping solution (not shown) and stripped sorbent for recontact with the pregnant leach solution 208.

The target valuable metal-rich stripping solution is formed into a target valuable metal product (not shown) (operation 136) and a byproduct salt solution 224. Valuable metal product formation can be, for example, by electrolysis or electrowinning, precipitation (which, for instance, forms a target metal sulfide or oxide), sorption (such as using activated carbon), membrane filtration, cementation, and/or amalgamation.

In the mill 108 and process plant 112, there are a number of processes for recovering rare earth metals as valuable metals.

One process configuration, that is particularly applicable to bastnaesite, selectively oxidizes rare earths. Cerium is separated after oxidation of cerium (III) to cerium (IV), simplifying the subsequent separation of the less abundant lanthanides. Oxidation occurs when bastnaesite is heated in the presence of molecular oxygen at a temperature typically of at least about 500° C. and even more typically of at least about 600° C. or when rare earth hydroxides are dried in the presence of molecular oxygen at a temperature, commonly in the range of from about 120 to about 130° C. Cerium (IV) is separated from the trivalent rare earths either by selective dissolution of trivalent rare earths with dilute acid or by complete dissolution of trivalent species with concentrated acid followed by selective precipitation of ceric hydroxide or solvent extraction of cerium (IV) as noted below. In aqueous solutions, cerium (III) is oxidized to cerium (IV) by electrolysis or treatment with hydrogen peroxide or sodium hypochlorite. Precipitation of hydrated cerium oxide then occurs when the pH is adjusted commonly to a pH of at least about pH 3 and even more commonly ranging from about pH 3 to about pH 7.

Another process configuration for recovering rare earths is set forth in U.S. Pat. Nos. 5,207,995 and 5,433,931, each of which is incorporated herein by this reference. The process is particularly useful in recovering rare earths from bastnaesite. In the process, a rare earth ore is ground to a $P_{90}$ size of 100 mesh (Tyler) (or a common mean, median, or $P_{90}$ size ranging from about 1 to about 100 microns and even more commonly from about 5 to about 25 microns). The ground ore is floated to form a rare earth concentrate (comprising most of the bastnaesite in the rare earth ore with the quartz, barite, calcite, and strontianite being separated in tailings). The concentrate is typically at least about 25 wt. % and even more typically ranges from about 35 to about 75 wt. % rare earths. The concentrate is subjected to a first acid leach with dilute hydrochloric acid (pH about 1.0) to remove some of the alkaline earth constituents of the concentrate and the leached ore roasted. The roasting is typically at about 400° C. to about 800° C. in the presence of molecular oxygen to convert fluorocarbonate mineral to a mixture of fluorides and oxides and oxidize cerium to cerium (IV). The roasted ore is subjected to a second acid leach with a more concentrated hydrochloric acid solution (which commonly comprises from about 0.1 to about 0.5N to about 0.2N hydrochloric acid) to remove the remaining alkaline earth constituents and separate cerium from other rare earth oxides. The ore is then treated with a third acid leach with a still more concentrated hydrochloric acid solution (e.g., commonly at least about 25 wt. %, more commonly from about 35 to about 75 wt. %, and even more commonly from about 40 to about 50 wt. % hydrochloric acid) to solubilize the cerium values for further processing. The pregnant leach solution typically includes at least most of the rare earth content of the rare earth concentrate and even more typically includes from about 25 to about 95 wt. % rare earths.

In another process configuration used for bastnaesite, the rare earth concentrate is leached with diluted or concentrated hydrochloric acid to dissolve, at least partially, the rare earths, which combine with the fluorine from the ore. The mixed rare earth-fluoride residue is decomposed using caustic soda at a temperature commonly ranging from about 100 to about 300° C. The resulting rare earth hydroxides are leached with diluted or concentrated hydrochloric acid. In another version of the process, diluted or concentrated sulfuric acid, instead of hydrochloric acid, can be used to dissolve the residue at a temperature commonly ranging from about 200 to about 500° C. The dissolved rare earths are then recovered as water-soluble sulfates. Polyvalent impurities, such as iron, are removed by pH neutralization.

In another process configuration, the rare earth is present in monazite and recovered by industrial digestion using caustic soda. The phosphate content of the ore is recovered as trisodium phosphate and the rare earths as rare earth hydroxides. The lixiviant commonly contains from about 25 to about 75 wt. % sodium or potassium hydroxide solution at a temperature ranging from about 125 to about 200° C. The resultant mixed rare earth and thorium hydroxide precipitate is dissolved in hydrochloric and/or nitric acid, processed to remove at least most of the thorium and other non-rare earth elements, and processed to recover the individual rare earths.

In another process configuration, the rare earth is present in loparite and recovered by a chlorination technique. This technique is conducted using gaseous chlorine at a temperature commonly ranging from about 500 to about 1,000° C. in the presence of carbon. Volatile chlorides are separated from the calcium-sodium-rare earth fused chloride, and the resultant precipitate dissolved in water. The dissolved rare earths are recovered by suitable techniques.

In another process configuration, the rare earth is present in loparite and recovered by a sulfation technique. This technique is conducted using a sulfuric acid solution (typically having from about 50 to about 95 wt. % sulfuric acid) at a temperature ranging from about 100 to about 250° C. in the presence of ammonium sulfate. The product is leached with water, while the double sulfates of the rare earths remain in the residue. The titanium, tantalum, and niobium sulfates transfer to the solution. The residue is converted to rare earth carbonates and then dissolved in, and isolated by suitable techniques from, nitric acid.

In the above process configurations, the concentrated rare earths can be recovered by any of a number of different techniques. In one configuration, the concentrated rare earths are separated by ion exchange. For example, pH dependent rare earth complexes form with citric acid or aminopolycarboxylate eluants (e.g., ethylenediaminetetraacetic acid (EDTA) and hydroxyethylenediaminetriacetic acid (HEEDTA). Phosphate-free resins are preferred to avoid rare earth poisoning of the resin due to incomplete elution of the rare earth from the resin. The rare earths are recovered by elution using a concentrated solution of a monovalent salt, such as ammonium chloride or sodium chloride. If a complexing agent exhibiting significantly different affinities for the various lanthanides is added to the eluant, a separation occurs. In another configuration, oil-soluble compounds separate rare earths by liquid-liquid extraction using acidic, basic, and/or neutral extractants. Typical acidic, basic, and neutral extractants include carboxylic acids, organophosphorus acids and esters thereof, tetraalkylammonium salts, alcohols, ethers, and ketones. In another configuration, rare earth halides are reduced to metal by reaction of more electropositive metals, such as calcium, lithium, sodium, potassium, and aluminum. In another configuration, electrolytic reduction is used to produce light lanthanide metals, including didymium (a Nd—Pr mixture). In another configuration, fractional distillation is used to recover and separate rare earths. In another configuration, zone melting is used to recover and separate rare earths. Due to the highly electropositive nature of rare earths, rare earth metals can be formed from aqueous solutions by fused salt electrolysis or metallothermic reduction.

The byproduct salt solution 224 and salt solution 216 can each include a variety of polyvalent impurities, including one or more of: more than about 20 ppb divalent calcium, more than about 20 ppb divalent magnesium, more than about 100 ppb divalent strontium, more than about 500 ppb divalent barium, more than about 100 ppb trivalent aluminum, more than about 1 ppm trivalent iron, more than about 15 ppm divalent mercury, more than about 10 g/L divalent sulfate anion, more than about 10 ppm silica, more than about 400 ppb monovalent fluorine, more than about 100 ppm radioactive nuclides (e.g., radium, uranium, and thorium) and daughters thereof, and more than about 10 ppb divalent nickel. Some of the impurities can be present at relatively high concentrations up to their solubility limits.

The byproduct salt solution 224 is combined with the salt solution 216, and the combined solution 228 optionally subjected to inorganic contaminant purification (step 232) to form a first purified solution 236. Although any contaminant removal techniques may be employed, inorganic contaminant removal can be by saturation, precipitation (such as with sodium or potassium hydroxide, oxide, or carbonate), clarification, filtration (such as membrane filtration), sorption (such as using an ion exchange or chelating resin (e.g., resins having aminomethylphosphonic-, iminodiacetic-type, or thiol functional groups), activated carbon, zeolites, alumina, silica alumina, and the like), electrolysis, dechlorination, cementation, and amalgamation). In one configuration, at least most of the dissolved polyvalent inorganic impurities, such as calcium, magnesium, iron, and other impurities, are removed by precipitation as oxides, carbonates, and/or hydroxides. This is typically effected using precipitants having a monovalent cation, such as sodium carbonate and sodium hydroxide. The precipitated impurities are removed or separated from the liquid phase by a thickening circuit, screening, filtration, cyclones, and the like. In one configuration, at least most of the dissolved polyvalent inorganic impurities are removed by an ion exchange or chelating resin. When the valuable metal is a rare earth, the resin should be substantially free of phosphate groups to avoid rare earth "poisoning" of the resin by incomplete elution of the rare earth. In one configuration, sulfate and other polyvalent anions are removed by refrigeration and crystallization, evaporative crystallization, and/or salting out of the contaminant.

The first purified solution 236 is optionally subjected to organic contaminant removal (step 240) to form a second purified solution 244. Although any contaminant removal techniques may be employed to remove at least most of the organics from the first purified solution 236, organic contaminant removal is commonly done by one or more of vacuum distillation, perevaporation, steam stripping, sorption (such as using an ion exchange or chelating resin), and membrane filtration.

The second purified solution 244 is optionally subjected to trace ion removal (step 248) to remove at least most of any remaining polyvalent ions and form a third purified solution 252. Step 248 is, in effect, a polishing operation. While any techniques (including those discussed above with reference to step 232) may be employed to remove remaining polyvalent ions, a common polishing mechanism is sorption (such as using an ion exchange or chelating resin) of the remaining polyvalent inorganic impurities. The third purified solution 252 should have a satisfactory level of impurities for the particular type of electrochemical acid generation employed. In one configuration, the third purified solution 252 has a salt at its saturation (under process operating temperature and pressure), which is usually between about 23 to about 28 wt. % salt dissolved in water.

Figure 3:
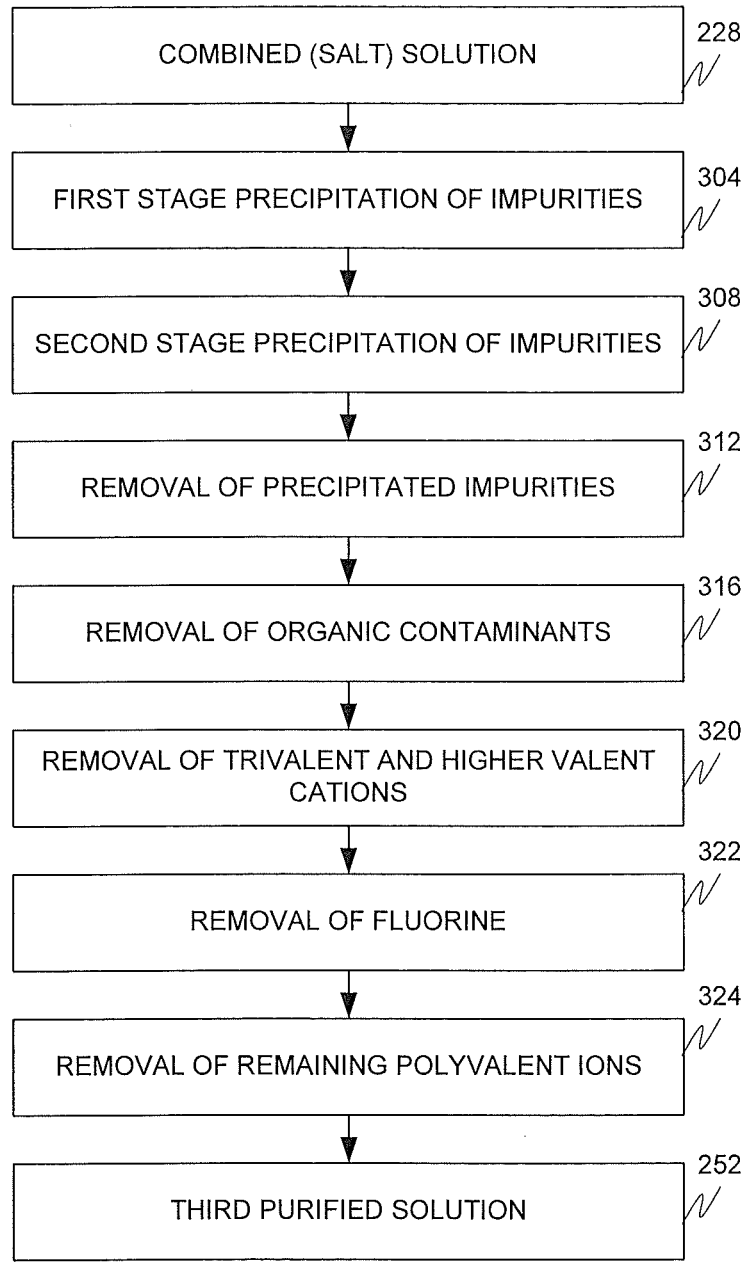
FIG. 3 is a block diagram depicting a purification process according to an embodiment.

FIG. 3 shows one particular configuration for purifying the combined solution 228 that is particularly applicable to rare earth metal recovery processes.

In a first stage precipitation of impurities 304, a base, such as caustic soda, is added to the combined solution 228, which typically has a typical pH of no more than about pH 8, to increase the pH to a typical pH of at least about pH 9. Certain of the polyvalent cationic impurities, namely trivalent rare earths, divalent alkaline earth metals, divalent strontium, divalent barium, divalent nickel, and trivalent aluminum, form carbonate precipitates. Trivalent iron typically does not precipitate in the first precipitation stage.

In a second stage precipitation of impurities 308, a stronger base, such as sodium hydroxide, is contacted with the combined solution 228 to further increase the pH to a typical pH of at least about pH 10 and even more typically at least about pH 11. More of the polyvalent cationic impurities, namely trivalent rare earths, divalent alkaline earth metals, divalent strontium, divalent barium, trivalent iron, divalent nickel, and trivalent aluminum, precipitate as hydroxides. After the first and second stages, typically at least most, even more typically at least about 75%, and even more typically at least about 90% of the polyvalent cations and anions are in the form of precipitates.

After the second precipitation stage 308, the combined salt solution 228 is contacted with a coagulant and flocculent and subjected to liquid/solid separation in step 312 by a suitable technique. Suitable techniques include size and/or weight separation techniques, such as filtration, cycloning, gravity settling, decantation, thickening, and combinations thereof, to remove commonly most, even more commonly at least about 75%, and even more commonly at least about 95% of the precipitates from the solution 228.

Following liquid/solid separation, the combined solution 228 may be pH-adjusted followed by contact, in step 316, of the pH-adjusted solution with a sorbent to remove at least most of the organic matter. The sorbent commonly used is activated carbon. The organic matter commonly includes dissolved solvent extraction or ion exchange resins, surfactants, flotation reagents (e.g., collectors and frothers), coagulants, and flocculants. In one application, the pH of the combined solution 228 is decreased by mineral acid addition to a pH commonly of no more than about pH 8.

The solution 228 is then subjected in step 324 to ion exchange removal of at least most of any remaining trivalent and higher valency cations. The resin commonly used has an iminodiacetic-type functional group.

The solution 228 is then passed through a mixed bed of anion and cation exchange resins to remove at least most of any remaining divalent cations and polyvalent anions, such as sulfates ($SO_4^{2-}$) and nitrates ($NO_3^{2-}$). The cation-exchange resin commonly used has an aminomethylphosphonic functional group. Sulfate and nitrate ions are strongly attracted to most strong-base anion-exchange resins. Exemplary anion-exchange resins include polystyrene resins (e.g., Amberlite IRA-400, 402, 404, 900, and 996™ by Aldrich, Duolite A-101D™, Ionac ASB-1 or 2™ and Ionac SR-7™, and Lewatit OC-1950™), polyacrylic resins (e.g., Amberlite IRA-458 and 958™), pyridine resins (e.g., Reillex HPQ™, B-1™, and DP-1™), and styrene-divinylbenzene copolymers which have either been sulphonated to form strongly acidic cation-exchangers or aminated to form strongly basic or weakly basic anion-exchangers.

The ordering of the iminodiacetic-type or aminomethylphosphonic-functional group resins in the treatment train enables removal of at least most of any remaining trivalent or higher valency cations by the iminodiacetic-type functional group before removal of the divalent cations by the aminomethylphosphonic-functional group. As noted, trivalent and higher valency cations, particularly trivalent rare earths, can poison the aminomethylphosphonic-functional group by incomplete elution of such cations.

Because a substantial portion, and in some cases at least most, of the fluorine in the combined solution 228 has not been removed by the prior purification steps and because fluorine can damage platinum electrodes in the electrochemical acid generation system, typically at least most and even more typically at least about 85% of the fluorine is removed in step 322 by a suitable technique. One technique is to remove fluorine by passing the solution 228 through an aluminum oxide polishing column. Another technique is to remove fluorine by passing the solution 228 through a rare earth-containing column. The column contains rare earth-containing particulates that can be supported or unsupported. The particulates contain primarily, on weight and molar bases, rare earth compounds. A preferred rare earth particulate is composed, on weight and molar bases, primarily of compounds of cerium (III), (IV), or a mixture thereof. Stated another way, the rare earth component of the rare earth-containing particulates is primarily cerium.

The solution 228 is finally passed through a polishing column to remove at least most of any remaining cations and form the third purified solution 252. A common polishing column comprises zeolites.

In another configuration, the various separations are effected using membrane filters applied to the solution 228 before or after first and second stage precipitation 304 and 308. For example, following removal of precipitated impurities 312, the solution 228 is first passed through a microfiltration and/or ultrafiltration membrane to remove in a first retentate at least most suspended and colloidal solids and organic contaminants and form a first permeate comprising at least most of the inorganic ions, and the first permeate is passed through an ultrafiltration, nanofiltration, and/or leaky reverse osmosis membrane to remove in a second retentate at least most of the polyvalent ions in the solution 228 and pass in a second permeate at least most of the monovalent ions in the solution 228. The second permeate is then optionally subjected to polishing to remove at least most of any remaining polyvalent ions and/or undesirable monovalent ions, particularly fluorine.

Regardless of the particular purification techniques employed, the third purified solution 252 typically has no more than about 20 ppb divalent calcium and magnesium, no more than about 100 ppb divalent strontium, no more than about 500 ppb divalent barium, no more than about 100 ppb trivalent aluminum, no more than about 1 ppm trivalent iron, no more than about 15 ppm divalent mercury, no more than about 10 g/L divalent sulfate anion, no more than about 10 ppm silica (in the presence of divalent calcium and trivalent aluminum), no more than about 400 ppb monovalent iodine (in the presence of divalent barium), and no more than about 10 ppb divalent nickel. In some applications, each impurity in the third purified solution 252 is present at a concentration of no more than about 1 ppm.

The above purification steps are typically performed to maintain at least most, even more typically at least about 75%, and even more typically at least about 95% of the salt cation and anion (e.g., sodium ion and chlorine ion) in solution. The various steps are therefore selectively performed to remove polyvalent and organic contaminants while avoiding removal of the salt components. Stated another way, the cation and anion exchange resins and sorbents referenced above, under the conditions of the solution 228, generally have limited or no affinity for either sodium or chlorine ions (when the salt is sodium chloride).

If necessary, the third purified solution 252 may be subjected to salt concentration (step 256) to adjust the salinity of the solution 252 to a level suitable for electrochemical acid generation. The salt concentrator may include multiple effect evaporators, energy efficient vapor recompressors, recompressors, and combinations thereof. If necessary, pH of the third purified solution 252 is performed using an acid or base produced by electrochemical acid generation operation 280.

The third purified solution 252 is introduced into the electrochemical acid generation operation 280 to convert the salt into a desired mix of the end products referenced above. In the configuration of FIG. 2, the end products are an aqueous mineral acid solution 260 and an aqueous sodium hydroxide solution 264. The aqueous mineral acid solution 260 is directed to the valuable metal dissolution operation 204. The aqueous base solution 264 is directed to the separation and product formation operations 212 and 136, as needed. Additional (fresh) salt solution 268, such as surface water, municipal water, industrial water, condensed steam, sea water, brine, or synthetically produced saline water, is added, as needed, to replace respective losses in the various unit operations.

The acid and base solutions can be concentrated, by optional concentrators 278 and 272, respectively, to produce the desired acid or base concentrations. Typically, the acid and base solutions will have acid and base concentrations, respectively, of no more than about 90, even more typically no more than about 75, and even more typically no more than about 50 wt. %. Exemplary concentrators are evaporators and distillation columns. In some applications, the acid or base solutions may require dilution to yield appropriate concentration levels.

The base solution can be pH adjusted in operation 282 using a suitable pH adjuster, such as an acidic pH or basic pH adjustor, as needed. Typically, the basic pH adjustor is sodium or potassium hydroxide produced during electrochemical acid generation 116.

Although not shown, additional hydrogen gas may need to be supplied to offset hydrogen losses during the process.

Water balance in the process can be maintained by a multiple-effect evaporation step. This occurs at the point in the process circuit where the salt is likely to precipitate due to super-saturation. The precipitated salt may be recycled back to the electrochemical acid generation operation 280.

EXAMPLES

Example A

Figure 4:
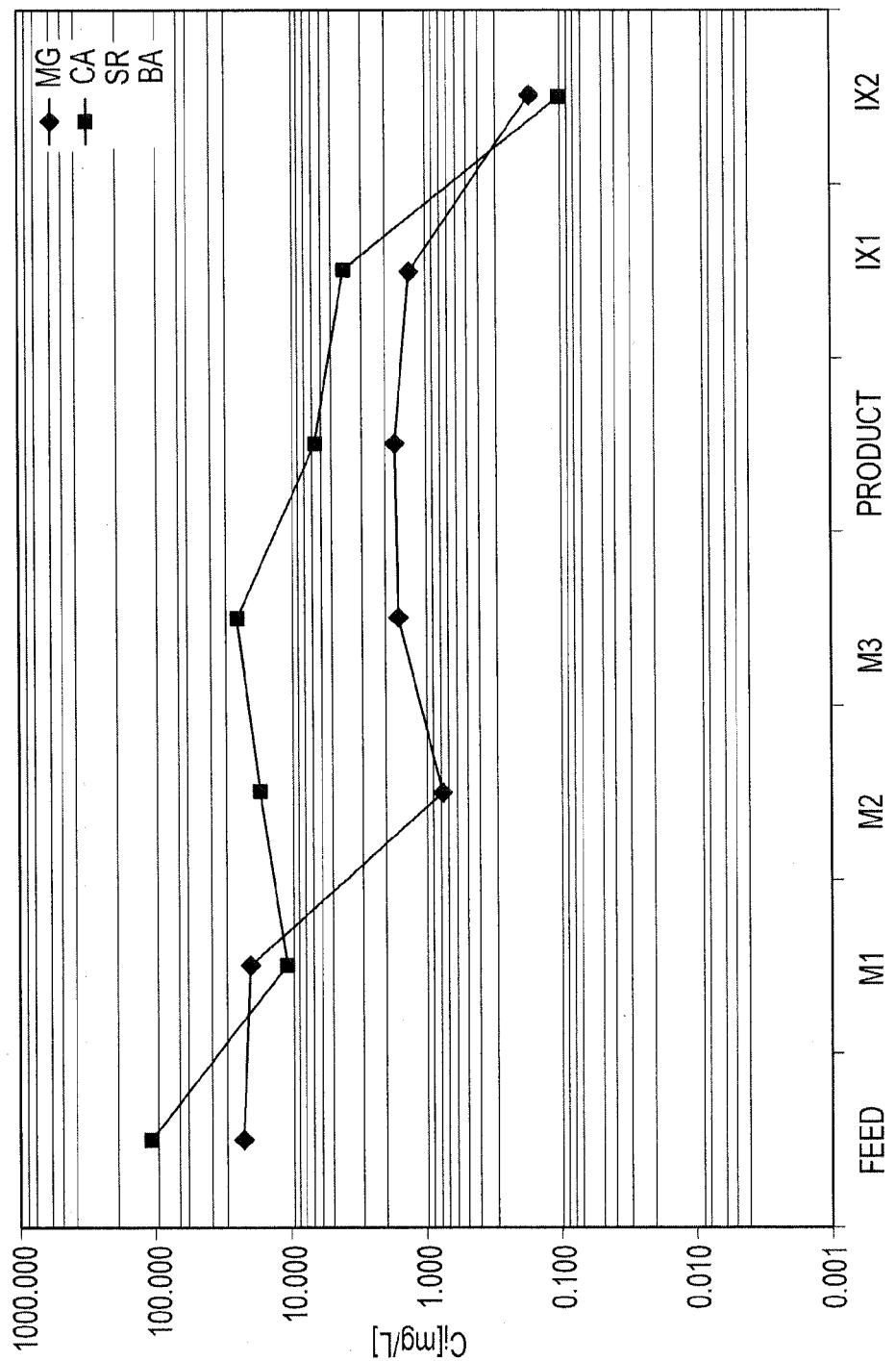
FIG. 4 shows the concentration of each of divalent magnesium, calcium, strontium and barium cations in the feed solution and after each of the precipitation stages M1, M2, M3 and ion exchange stages IX1 and IX2.
Figure 5:
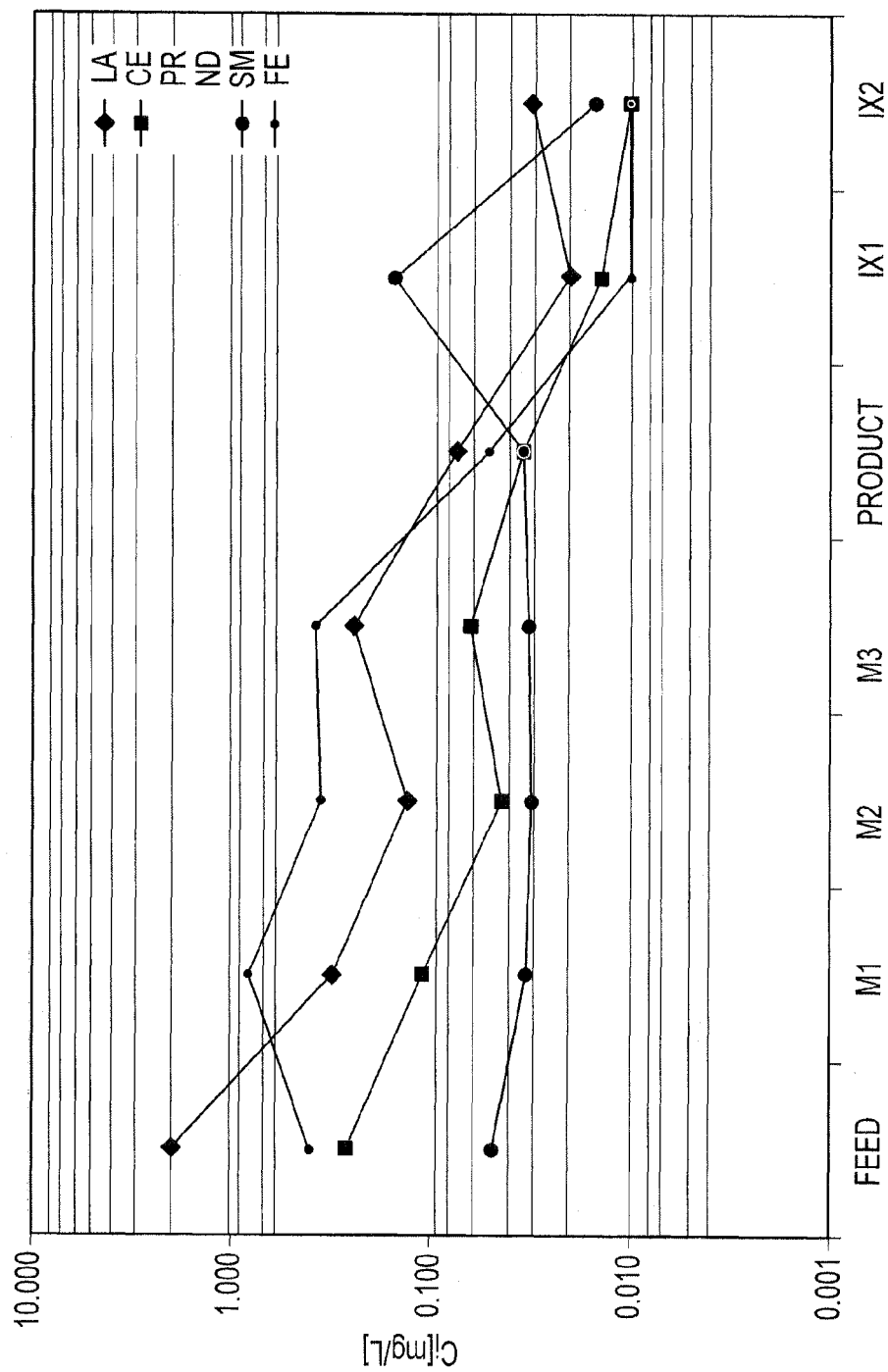
FIG. 5 shows the concentration of each of trivalent lanthanum, cerium, praseodymium, neodymium, samarium and iron cations in the feed solution and after each of the precipitation stages M1, M2, M3 and ion exchange stages IX1 and IX2.

Example A was a determination of a multi-stage precipitation and ion exchange process for removing divalen and trivalent cations prior to a salt splitting process. FIGS. 4 and 5, respectively, show decreases in the divalent alkaline earth (specifically, magnesium, calcium, strontium and barium) and trivalent (lanthanum, cerium, praseodymium, neodymium, samarium and iron) cations after each of the precipitation and ion exchange stages.

M1 is the first precipitation stage (FIG. 3) where a salt solution (such as, the byproduct salt solution 224, the valuable metal-barren salt solution 216 or the combination of thereof (combined solution 228) as described above) having a pH of about pH 7 was contacted with a sodium carbonate solution having a pH of about pH 9.5 to form a metal carbonate slurry. Dissolving sodium carbonate in water with agitation formed the sodium carbonate solution. The metal carbonate slurry had metal carbonate precipitates dispersed in salt water. The metal carbonates typically precipitated are lanthanum carbonate, cerium carbonate, praseodymium carbonate, neodymium carbonate, samarium carbonate, magnesium carbonate, strontium carbonate, barium carbonate, calcium carbonate, lead carbonate, uranium carbonate and aluminum carbonate.

M2 is the second precipitation stage (FIG. 3) where the metal carbonate slurry was contacted with a sodium hydroxide solution having about 8 wt % NaOH to further raise the pH to a pH of from about pH 11 to about pH2 and to further precipitate as hydroxides any of the metals identified above (such as lanthanum, cerium, praseodymium, neodymium, samarium, magnesium, strontium, barium, calcium, lead, uranium and aluminum) remaining in solution.

M3 is third precipitation stage (FIG. 3) where a coagulant, such as alum ($Al_2(SO_4)_3$), was contacted with the metal carbonates and hydroxides (hereafter referred to as metal solids). The contacting of the coagulant with the metal solids flocculated and/or increased the particle size of the metal solids, thereby increasing the efficiency of separating the metal solids from the solution liquid phase. The liquid phase contained NaCl, organics, and decreased amounts of the divalent and trivalent cations compared to the salt solution (FIGS. 4 and 5).

Coagulation and flocculation in a high salt concentration solution is difficult. However, it is preferred to substantially remove divalent and trivalent ions and/or solids prior to conducting a chloroalkali process. Hydrochloric acid (about 18 wt % HCl) was added to the aqueous stream to adjust the pH to about pH7.

The pH adjusted aqueous stream was filtered and ran through an activated carbon filter prior to contacting the aqueous stream with a first IX1 ion exchange resin IX1 (FIG. 3). The first ion exchange resin was an iminodiacetic function resin sold under the trade name of Amberlite IRC-748i from Rohm & Haas to form a first ion-exchanged solution having a decreased content of divalent and trivalent cations compared to the pH adjusted aqueous stream (FIGS. 4 and 5).

The first ion-exchanged solution was contacted with a second ion-exchange resin IX2 (FIG. 3) to form a second ion-exchanged solution having a reduced divalent and trivalent ion content compared to the first ion-exchanged solution (FIGS. 4 and 5). The second ion-exchange resin is an aminomethylphosphonic function resin sold under the trade name of Amberlite IRC-747 by Rohm & Haas.

Example B

Figure 6:
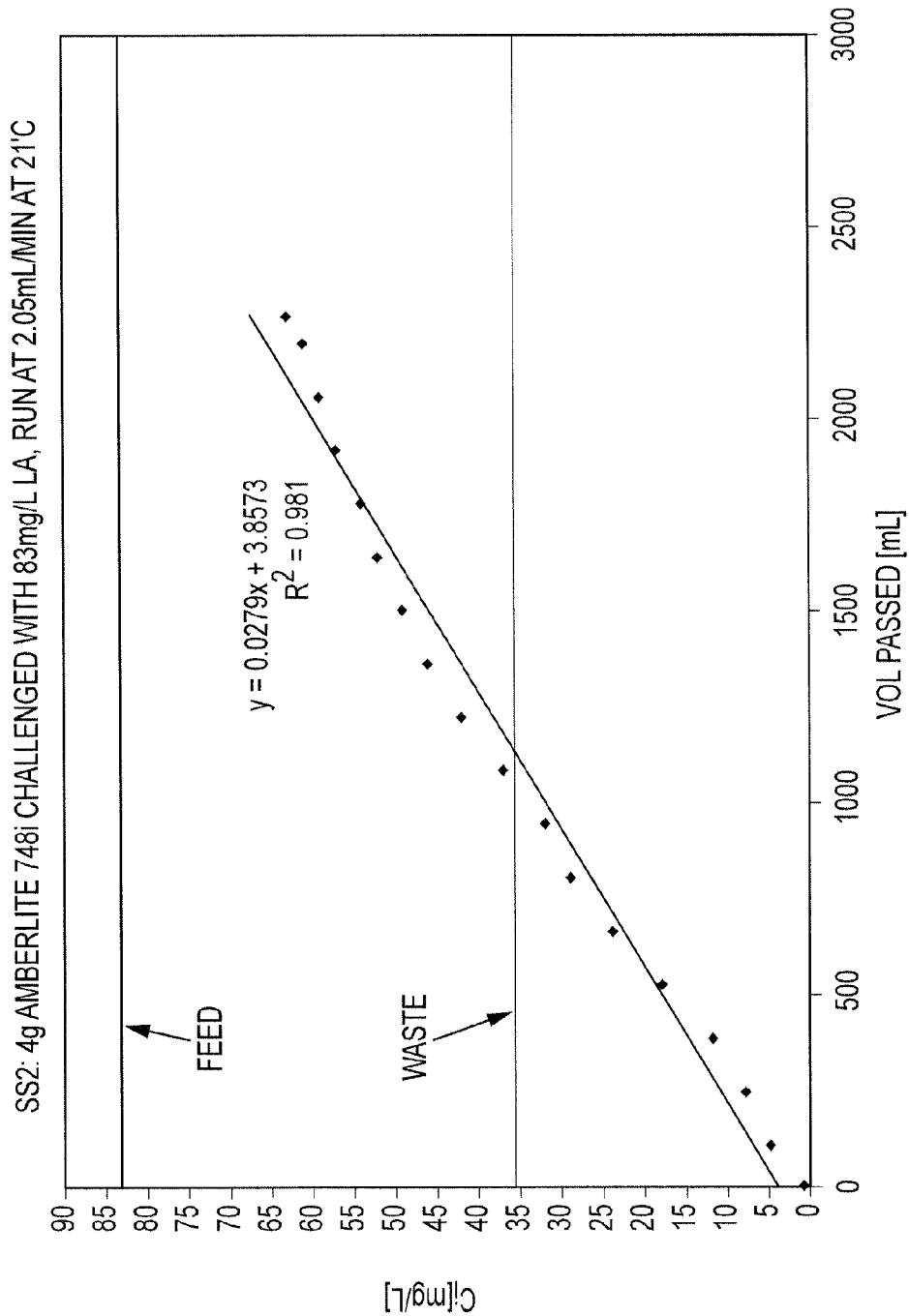
FIG. 6 shows challenge curve for Amberlite 748i (about 4 grams) challenged with a solution containing about 83 mg of lanthanum/L (as lanthanum chloride) at a flow rate of about 2.5 mL/minute at about 21 degrees Celsius, with the x-axis being the total volume of lanthanum solution challenging the Amberlite 748i and the y-axis being the lanthanum concentration in mg/L of the effluent from the challenged column.

Example B was a determination of the loading capacity of trivalent cation on a chelating ion exchange resin (IX1 in FIG. 3). The chelating ion exchange resin evaluated was an iminodiacetic resin sold under the trade name of Amberlite IRC-748i from Rohm & Haas. The trivalent cation was lanthanum. A lanthanum feed solution having a pH of about pH 4, about 50 g/L NaCl and 83 mg/L of lanthanum (as $LaCl_3$) was prepared by dissolving about 400 mg of Lanthanum oxide ($La_2O_3$) in hydrochloric acid (about 3.7 ml of 2 N HCl)). After dissolving the lanthanum oxide, about 200 grams of NaCl was added, the pH was adjusted with 1 N NaOH to a pH of about pH 4 and de-ionized water was added to form a final volume of about 4 liters. A column was packed with the Amberlite IRC-748i resin. The lanthanum feed solution as passed through the packed column at a rate of about 2.05 mL/min at about 21 degrees Celsius (see FIG. 6). The maximum trivalent cation capacity of the iminodiacetic resin was determined to be about 117 mg of lanthanum or about 29 mg of lanthanum per gram of resin. The resin was loaded with about 108 mg of lanthanum. The total loading was calculated by determining the area under the breakthrough curve (FIG. 6).

Example C

Figure 7:
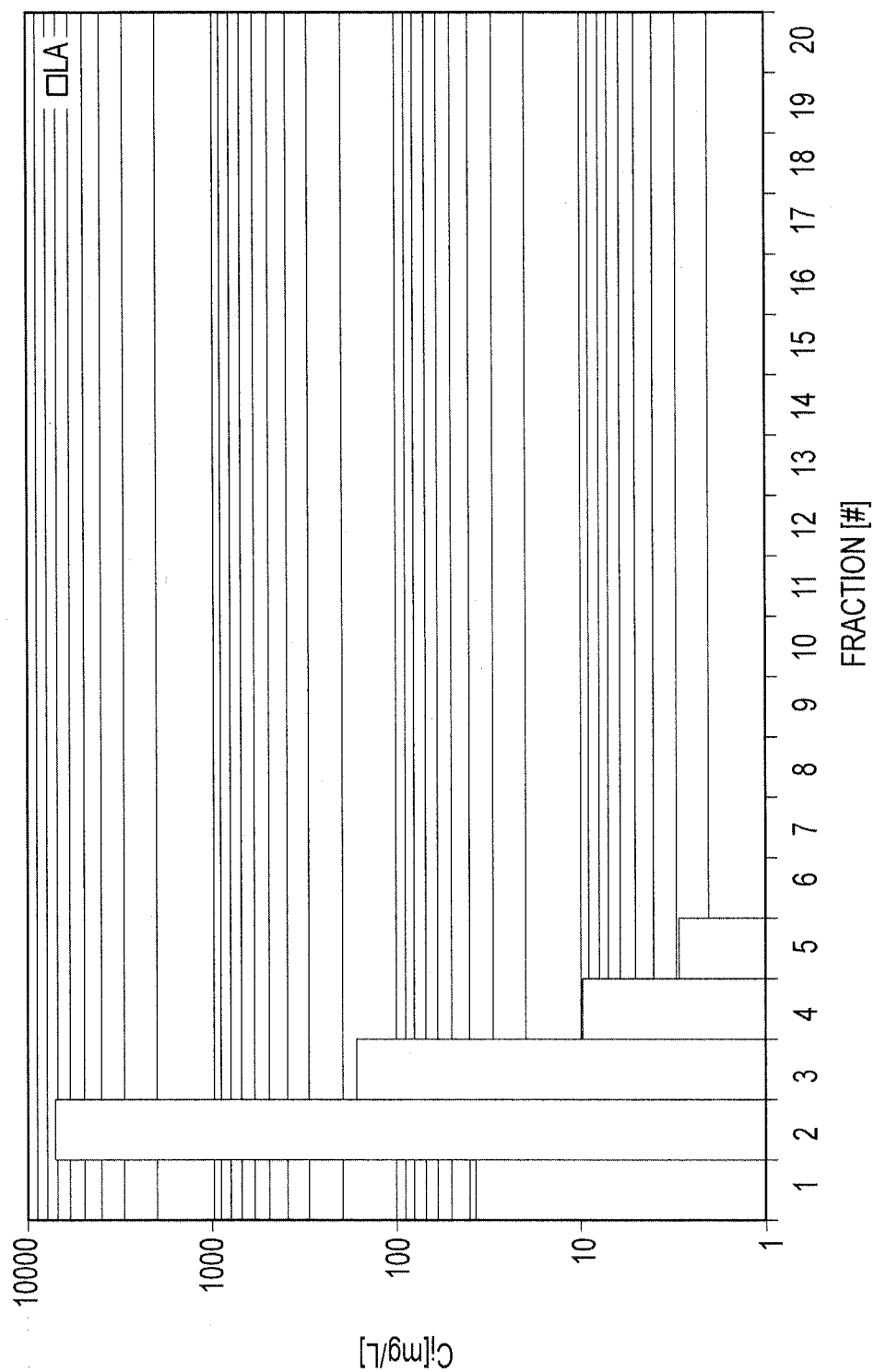
FIG. 7 shows concentration of lanthan contained within each fraction collected from an Amberlite 748i resin loaded with lanthanum.

Example C was a determination of the removal capacity of the trivalent cation loaded on the resin in IX1 in Example B. The resin tested was an iminodiacetic function resin sold under the tradename of Amberlite IRC-748i by Rohm & Haas. The trivalent cation was lanthanum. About 108 milligrams of lanthanum was loaded on a resin column containing about 4 grams of Amberlite 748i. The lanthanum loaded column was regenerated with a hydrochloric acid solution having a normality of about 2.6N, the flow rate of the hydrochloric acid solution was about 2.7 mL/min. Fractions were collected about every 5 minutes. The first 5 fractions contained detectable amounts of lanthanum (see FIG. 7). The first 5 fractions contained a total of 104 mg of lanthanum, which was within experimental error of the 108 mg of lanthanum loaded on the column. The second fraction had the highest lanthanum concentration of about 7.5 g/L. The fractions beyond the fifth fraction did not contain any detectable amounts of lanthanum. It was assumed from this example that an iminodiacetic function resin loaded with a trivalent cation, such as lanthanum, can be regenerated with hydrochloric acid.

Example D

Figure 8:
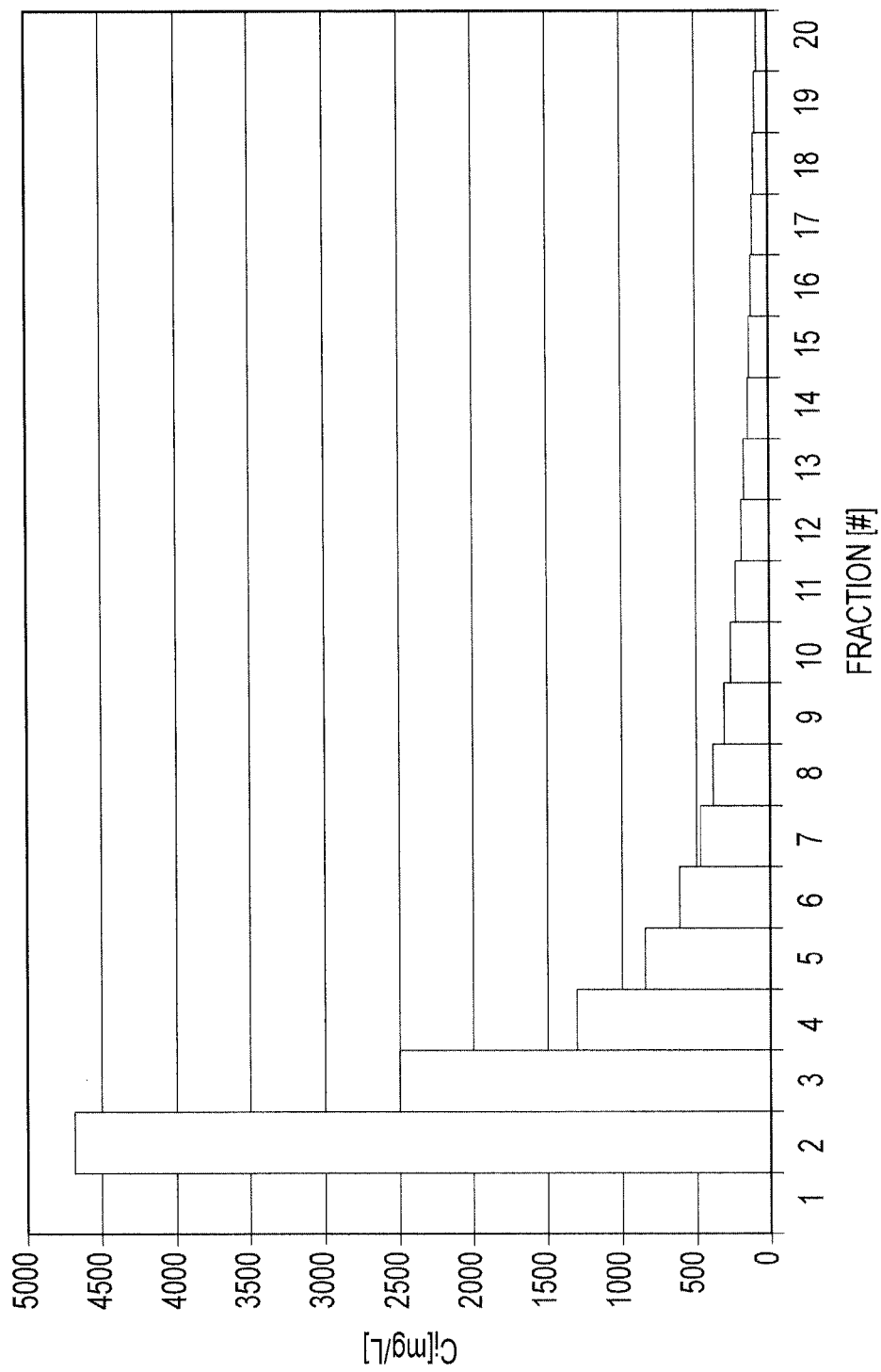
FIG. 8 shows concentration of lanthanum contained with each fraction collected from an Amberlite resin IPC 747 resin loaded with lanthanum.

Example D was a determination of the removal capacity of a trivalent cation loaded on a resin in IX2 of the brine finishing process (FIG. 3). The resin tested was an aminomethylphosphonic function resin sold under the trade name of Amberlite IRC-747 by Rohm & Haas. The trivalent cation was lanthanum. About 88 mg of lanthanum was loaded on a resin column containing about 4 grams of Amberlite IRC-747. The loaded column was regenerated with a hydrochloric acid solution having a normality of about 2.6 N. The flow rate of the 2.6 N HCl solution was about 1.9 mL/min. 20 volume fractions were collected from the column. Fractions were collected about every 5 minutes. Lanthanum was detected in each of the twenty volume fractions. While about 88 mg of lanthanum appeared to have been loaded on the column, about 117 mg of lanthanum appeared to have been unloaded from the column (FIG. 8). This discrepancy was believed to be due to an analytical error. More specifically, it is believed that the column was loaded with a feed solution containing 60 mg lanthanum/L and not about 42 mg lanthanum/L. About 125 mg of lanthanum would have been loaded on the column from the 60 mg lanthanum/L solution, which would have better coincided with the 117 mg of lanthanum unloaded from the column.

Example E

Figure 9:
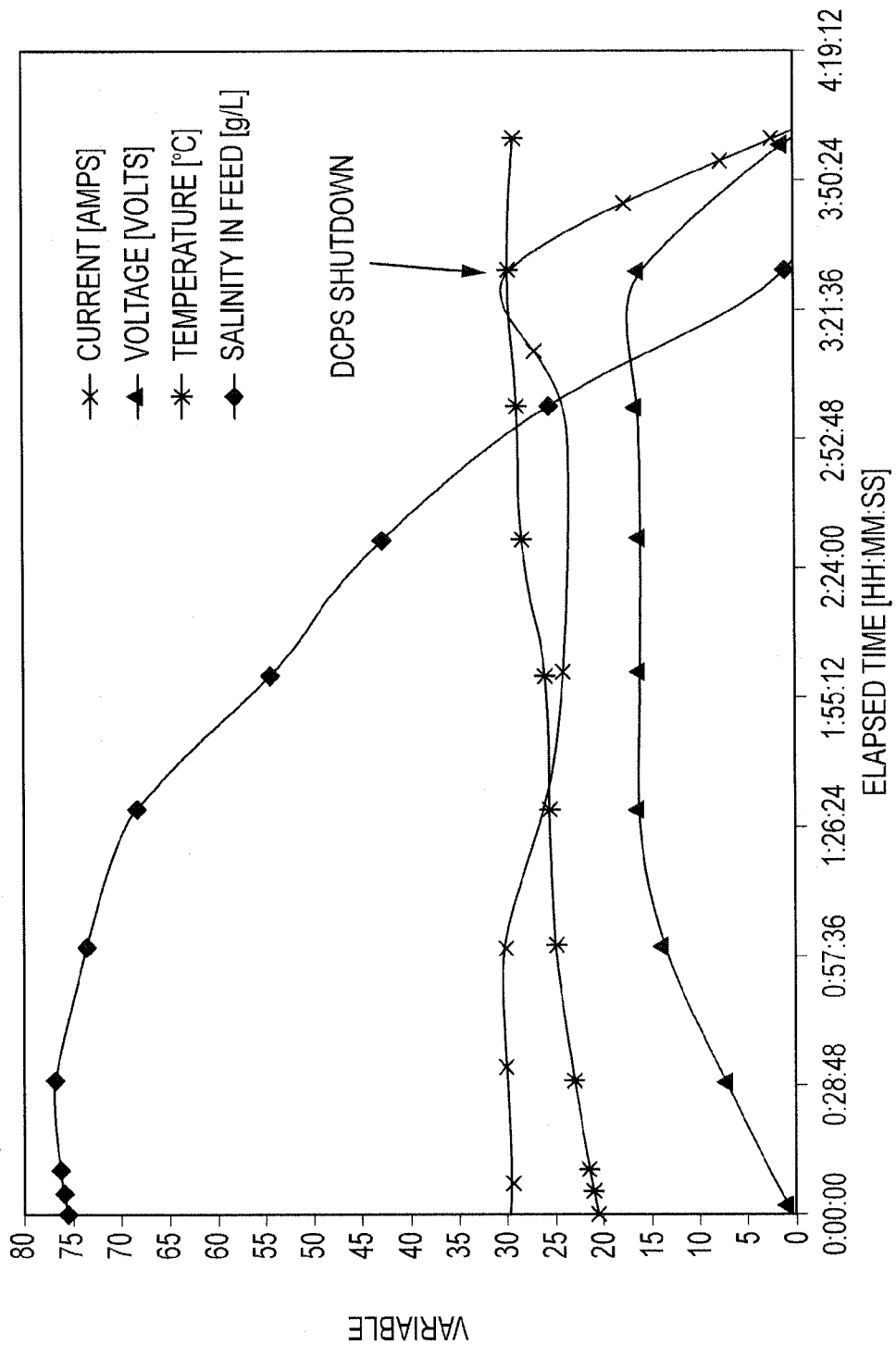
FIG. 9 shows the variation of current, voltage, temperature and salinity during a salt splitting process for 12 L of a 75 g NaCl/liter solution.

Example E was a determination of optimal operating conditions for salt splitting prior to operating the salt splitter in a steady state, continuous mode. Inductively coupled plasma atomic emission spectroscopy (ICP-AES) was used to verify the purity of the brine feed. The brine feed had no more than about 0.5 ppm of divalents and iron. Salinity of the feed tank was measured with a conductivity probe and found to be about 7.8 mmhos. The conductivity probe was calibrated against 3 calibration standards at 5, 50 and 100 g/L salt, which had conductivities of 0.82, 6.84 and 13.21 mmhos, respectively. Current and voltage levels were read from salt splitter DC-power supply. The brine feed solution was circulated through a bipolar membrane electrodialysis stack, that is an anion exchange membrane, cation exchange membrane and bipolar membrane, gaskets, flow distribution, electrodes, etc at about 0.8 gallons per minute. This circulation rate turned each of the salt water feed, acid, base and electrode rinse tanks, respectively, having about 12 liters of solution, over about every 4 minutes. The acid and base salt splitter tanks contained de-ionized water. The electrode rinse tank contained 2N NaOH solution and the brine feed solution contained about 75 g NaCl/liter and had a pH of about pH 2. After a consistent flow rate was established through the membrane stack and a solution substantially free of bubbles was obtained, the DC power supply was activated. The DC power supply was adjusted to pass about 16 amps of current through the brine solution, while the voltage was allowed to vary. The conductivity, current, voltage, feed solution temperature and acid and base normalities were determined as a function of time until the brine feed NaCl content was substantially depleted to about zero (FIG. 9). The NaCl content of the brine feed was depleted in about 3.5 hours. The acid and base compartments, respectively, had ending normalities of about 0.8 N HCl and about 0.8 N NaOH.

Example F

Figure 10:
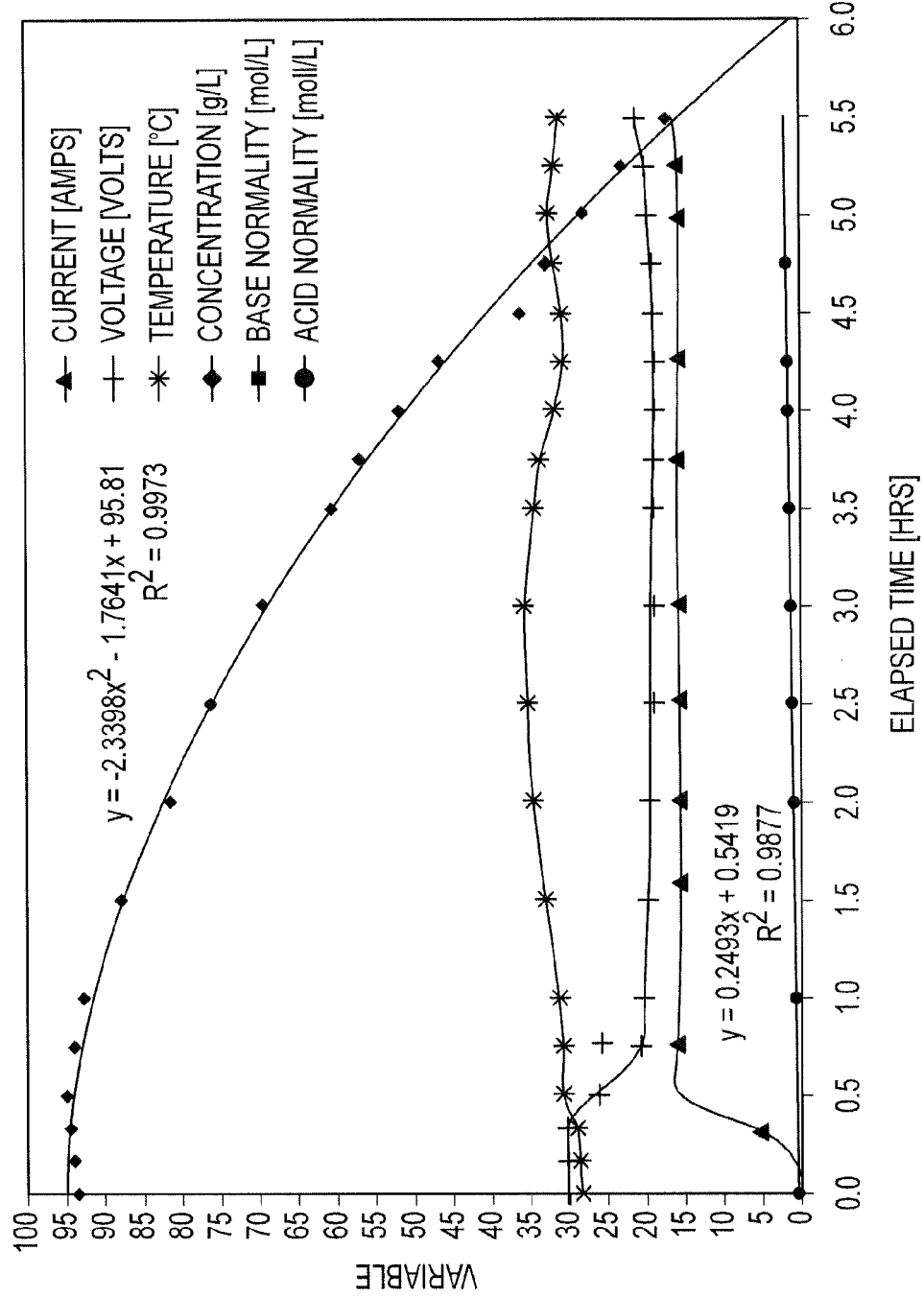
FIG. 10 shows, as a function of time, the current, voltage and temperature of a salt splitting process for a salt feed having 95 g NaCl/L and the resulting decrease in of NaCl concentration for the salt feed and the respective increases in the acid and base concentrations in acid and base tanks of the salt splitting cell.

Example F was a determination of the conversion rate for a salt feed containing about 95 grams NaCl per liter. The brine feed was verified for purity using ICP-AES. The brine feed had no more than about 0.5 ppm of divalents and iron, Salinity of the feed tank was measured with a conductivity probe and found to be about 7.8 mmhos. The conductivity probe was calibrated against 3 calibration standards at 5, 50 and 100 g/L salt, which had conductivities of 0.82, 6.84 and 13.21 mmhos, respectively. Current and voltage levels were read from the salt splitter DC-power supply. The brine feed solution was circulated through a bipolar membrane electrodialysis stack at about 0.8 gallons per minute. This circulation rate turned each of the salt water feed, acid, base and electrode rinse tanks, respectively, having about 12 liters of solution over about every 4 minutes. The acid and base salt splitter tanks, respectively, contained about 0.5 N HCl and about 0.5 N NaOH. The electrode rinse tank contained a 2N NaOH solution and the brine feed tank contained about 95 g NaCl/liter and had a pH of about pH2. The DC power supply was activated after a consistent flow rate was established through the membrane stack and the solution was substantially free of bubbles. The DC power supply was adjusted to pass about 16 amps of current through the brine solution and the voltage was allowed to vary. After about 30 minutes of operation, the applied voltage and current stabilized to about 19 volts and 16 amps, respectively (FIG. 10). The conductivity, current, voltage, feed solution temperature and acid and base normalities were measured as a function of time (FIG. 10). The NaCl content of the brine feed decreased during electrolysis, from about 95 g/L to about 17 g/L over about a 5 hour electrolysis period. Further, over the 5 hour electrolysis period, about 934 grams of NaCl was converted into hydrochloric acid and sodium hydroxide. The average conversion rate was about 22 grams per square meter (of electrode surface area) per minute. The acid and base compartments, respectively, had ending normalities of about 2 N HCl and about 2 N NaOH. About 800 grams of water was electrolyzed in the process. A quantitative analysis of the amount of NaCl in the feed solution consumed per hour by electrolysis yielded the following quadratic equation:

$$C_i[g/L] - 2.34t^2 - 1.76t + 95.81, \text{ where } t \text{ is hours}$$

The DC power supply, on average, applied about 16 amps at about a 19 volt potential. The theoretical equivalents of NaOH and HCl produced were determined to be about 4.2 equivalents per hour, with a current efficiency of about 76%. The power utilized to convert NaCl to hydrochloric and sodium hydroxide was about 1.6 kW hours per kg of NaCl produced.

A number of variations and modifications can be used. It would be possible to provide for some features without providing others.

The various aspects, embodiments, and configurations, include components, methods, processes, systems and/or apparatus substantially as depicted and described herein, including various embodiments, configurations, aspects, sub-combinations, and subsets thereof. Those of skill in the art will understand how to make and use the aspects, embodiments, or configurations disclosed herein after understanding the present disclosure. The various aspects, embodiments, and configurations, include providing devices and processes in the absence of items not depicted and/or described herein or in various embodiments, configurations, or aspects hereof, including in the absence of such items as may have been used in previous devices or processes, e.g., for improving performance, achieving ease and\or reducing cost of implementation.

The foregoing discussion has been presented for purposes of illustration and description. The foregoing is not intended to limit the aspects, embodiments, or configurations to the form or forms disclosed herein. In the foregoing Detailed Description for example, various features of the aspects, embodiments, or configurations are grouped together in one or more embodiments, configurations, or aspects for the purpose of streamlining the disclosure. The features of the aspects, embodiments, or configurations, may be combined in alternate aspects, embodiments, or configurations other than those discussed above. This method of disclosure is not to be interpreted as reflecting an intention that the aspects, embodiments, or configurations require more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate aspect, embodiment, or configuration.

Moreover, though the description has included description of one or more aspects, embodiments, or configurations and certain variations and modifications, other variations, combinations, and modifications are within the scope of the aspects, embodiments, or configurations, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A process, comprising:
    contacting a valuable metal-containing material with an acidic leaching solution having an acid component to form a pregnant leach solution comprising a dissolved valuable metal;
    recovering the dissolved valuable metal to form a valuable metal product and a byproduct salt solution, the byproduct salt solution is derived from reacting a base with the acid component, wherein the valuable metal is a rare earth, wherein the acid component is hydrochloric acid, wherein the salt in the byproduct salt solution is one or more of sodium chloride and potassium chloride, wherein the base is one or more of sodium hydroxide and potassium hydroxide, and wherein the valuable metal product is a rare earth oxide;
    removing greater than about 50% of a selected polyvalent impurity from the byproduct salt solution to form a first purified salt solution;
    removing greater than about 50% of a selected organic contaminant from the first purified salt solution to form a second purified salt solution, the selected organic contaminant comprises one or more of a dissolved solvent extraction resin, a dissolved ion exchange resin, a surfactant, a flotation reagent, a coagulant, and a flocculant;
    electrochemically converting the second purified salt solution into the acid component and the base;
    recycling the acid component of the electrochemically converting step to the contacting step; and
    recycling the base of the electrochemically converting step to at least one of the contacting and recovering steps.

2. The process of claim 1, wherein the electrochemically converting step is performed by at least one of a chloralkali and bipolar membrane electrodialysis cell, wherein greater than about 50% of the byproduct salt solution is converted into the acid component and base and wherein greater than about 50% of the acid component and base are recycled.

3. The process of claim 1, wherein the electrochemically converting step is performed by at least one of a chloralkali and bipolar membrane electrodialysis cell.

4. The process of claim 1, wherein the converting step produces hydrogen gas and chlorine gas, and wherein the electrochemically converting step further comprises:
    reacting chlorine gas with hydrogen gas to produce hydrochloric acid.

5. The process of claim 1, wherein the converting step comprises:
    introducing the second purified salt solution into the at least one of a chloralkali and bipolar membrane electrodialysis cell to form the acid component and base.

6. The process of claim 1, wherein the electrochemically converting step is performed by at least one of a chloralkali and bipolar membrane electrodialysis cell, wherein the selected polyvalent impurity is a cation, wherein the selected polyvalent cation is removed by precipitation induced by a pH change resulting from contact of the base with the byproduct salt solution, and wherein the introducing step comprises:
    contacting the first purified salt solution with an ion exchange resin to remove additional polyvalent cationic impurities;
    thereafter processing the second purified salt solution by a salt concentrator to form a concentrated and purified salt solution; and
    introducing the concentrated and purified solution and a mineral acid into an anolyte recirculation tank, wherein the concentrated and purified solution is introduced into the at least one of a chloralkali and bipolar membrane electrodialysis cell.

7. The process of claim 1, wherein the acid component is hydrochloric acid, wherein the converting step produces hydrogen gas and chlorine gas, and one or both of sodium hydroxide and potassium hydroxide; and further wherein chlorine and one or both of sodium hydroxide and potassium hydroxide are used to produce one or both of sodium hypochlorite and potassium hypochlorite and further comprising:
    receiving electrical energy from a cogen plant, the electrical energy being used in two or more of the contacting, recovering, converting and recycling steps;
    receiving waste heat from the cogen plant, the waste heat being used in two or more of the contacting, recovering, converting and recycling steps.

8. The process of claim 1, wherein the electrochemically converting step is performed by a chloralkali cell, further comprising:
    maintaining an approximate stoichiometric balance between chlorine and hydrogen gas produced in the converting step.

9. The process of claim 1, wherein the electrochemically converting step is performed by at least one of a chloralkali cell and bipolar membrane electrodialysis cell, wherein the organic contaminant is removed by one or more of vacuum distillation, pervaporation, steam stripping, sorption, and membrane filtration.

10. The process of claim 1, wherein, in each of the recycle steps, the acid component and base are concentrated and/or pH adjusted.

11. The process of claim 5, wherein the selected polyvalent impurity is calcium.

12. The process of claim 6, wherein the selected polyvalent impurity is calcium.

13. The process of claim 1, wherein the selected polyvalent impurity is one or more of: more than about 20 ppb divalent calcium, more than about 20 ppb divalent magnesium, more than about 100 ppb divalent strontium, more than about 500 ppb divalent barium, more than about 100 ppb trivalent aluminum, more than about 1 ppm trivalent iron, more than about 15 ppm divalent mercury, more than about 10 g/L divalent sulfate anion, more than about 100 ppm radioactive nuclides and daughters thereof, more than about 10 ppm silica, and more than about 10 ppb divalent nickel, wherein the second purified solution comprises no more than about 20 ppb divalent calcium and magnesium, no more than about 100 ppb divalent strontium, no more than about 500 ppb divalent barium, no more than about 100 ppb trivalent aluminum, no more than about 1 ppm trivalent iron, no more than about 15 ppm divalent mercury, no more than about 10 g/L divalent sulfate anion, no more than about 10 ppm silica (in the presence of divalent calcium and trivalent aluminum), no more than about 400 ppb monovalent iodine (in the presence of divalent barium), and no more than about 10 ppb divalent nickel, and wherein polyvalent impurity removing step comprises the substeps:
    contacting the base with the byproduct salt solution to increase a pH of the byproduct salt solution to a pH of at least about pH 9 to precipitate a first part of the selected polyvalent impurity;
    removing the precipitated selected polyvalent impurity from the byproduct salt solution to form a treated byproduct salt solution, the treated byproduct salt solution comprising unprecipitated selected polyvalent impurity;
    contacting the treated byproduct salt solution with an ion exchange resin to remove a part of the unprecipitated selected polyvalent impurity and form a further treated byproduct salt solution, the further treated byproduct salt solution comprising unremoved selected polyvalent impurity; and
    contacting the further treated byproduct salt solution with a mixed bed of anion and cation exchange resins to remove the unremoved selected polyvalent impurity and form the first purified salt solution, wherein the contaminant removal steps are conducted to maintain greater than about 50% of the salt cation and anion in solution.

14. The process of claim 13, wherein the ion exchange resin is substantially free of phosphate groups.

15. The process of claim 1, wherein the byproduct salt solution comprises more than about 400 ppb monovalent fluorine and further comprising:
    removing the monovalent fluorine by at least one of passing the byproduct salt solution through an aluminum oxide polishing column and passing the byproduct salt solution through a rare earth-containing column.

16. A method, comprising:
    comminuting, by a mill, a feed material comprising a valuable metal-containing mineral;
    forming, by the mill and from the valuable metal-containing mineral, a concentrate containing the valuable metal-containing mineral;
    recovering, by a process plant, the valuable metal from the valuable metal-containing mineral, wherein at least one of the mill and process plant generate a byproduct salt solution from a mineral acid and a base, the byproduct salt solution comprising fluorine and an organic contaminant, wherein the valuable metal is a rare earth, wherein the acid component is hydrochloric acid, wherein the salt in the byproduct salt solution is one or both of sodium chloride and potassium chloride, wherein the base is one or both of sodium hydroxide and potassium hydroxide, and wherein the valuable metal product is a rare earth oxide;
    removing, by an inorganic contaminant purification circuit, at least about 85% of fluorine from the byproduct salt solution;
    removing, by an organic contaminant purification circuit, an organic contaminant from the byproduct salt solution; and
    generating, by an electrochemical acid generation plant, the mineral acid and base from the byproduct salt solution to provide the mineral acid and base to at least one of the mill and process plant.

17. The method of claim 16, wherein the electrochemical acid generation plant comprises at least one of a chloralkali cell and bipolar membrane electrodialysis cell.

18. The method of claim 16, wherein the electrochemical acid generation plant comprises at least one of a chloralkali cell and bipolar membrane electrodialysis cell, wherein the at least one of a chloralkali cell and bipolar membrane electrodialysis cell is the bipolar membrane electrodialysis cell.

19. The method of claim 16, wherein the electrochemical acid generation plant comprises at least one of a chloralkali cell and bipolar membrane electrodialysis cell, wherein the at least one of a chloralkali cell and bipolar membrane electrodialysis cell is the chloralkali cell.

20. The method of claim 16, wherein the electrochemical acid generation plant comprises a chloralkali cell, wherein the valuable metal is one or more of yttrium, scandium, and a lanthanide.

21. The method of claim 16, wherein the electrochemical acid generation plant produces hydrogen gas and chlorine gas, and wherein the electrochemical acid generation plant reacts chlorine gas with hydrogen gas to produce hydrochloric acid.

22. The method of claim 16, wherein the electrochemical acid generation plant comprises at least one of a chloralkali cell and bipolar membrane electrodialysis cell, wherein the electrochemical acid generation plant:
    removes greater than about 50% of a selected polyvalent impurity from the byproduct salt solution to form a purified salt solution; and
    introduces the purified salt solution into the at least one of a chloralkali cell and bipolar membrane electrodialysis cell to form the acid component and base.

23. The method of claim 22, wherein the selected polyvalent impurity is a cation, wherein the selected polyvalent cation is removed by precipitation induced by a pH change resulting from contact of the base with the byproduct salt solution, and wherein the electrochemical acid generation plant:
    contacts the purified salt solution with an ion exchange resin to remove additional polyvalent cationic impurities;
    thereafter processes the purified salt solution by a salt concentrator to form a concentrated and purified salt solution; and
    introduces a concentrated and purified solution and a mineral acid into an anolyte recirculation tank, wherein the concentrated and purified solution is introduced into the at least one of a chloralkali cell and bipolar membrane electrodialysis cell.

24. The method of claim 16, further comprising:
providing, by a cogen plant, electrical and waste thermal energy to one or more of the mill and process plant.

25. The method of claim 16, wherein the electrochemical acid generation plant comprises at least one of a chloralkali cell and bipolar membrane electrodialysis cell, wherein the byproduct salt solution comprises an organic contaminant and wherein the electrochemical acid generation plant removes greater than about 50% of the organic contaminant to form a purified salt solution, wherein the purified salt solution is introduced into the at least one of a chloralkali cell and bipolar membrane electrodialysis cell to form the acid component and base.

26. The method of claim 22, wherein the selected polyvalent impurity is calcium.

27. The method of claim 23, wherein the selected polyvalent impurity is calcium.

28. A method, comprising:
communuting, by a mill, a feed material comprising a valuable metal-containing mineral, wherein the valuable metal is a rare earth;
forming, by the mill and from the valuable metal-containing mineral, a concentrate containing the rare earth-containing mineral;
recovering, by a process plant, a valuable metal product from the valuable metal-containing mineral, wherein the valuable metal product is a rare earth oxide;
generating, by an electrochemical acid generation plant comprising at least one of a chloralkali cell and bipolar membrane electrodialysis cell, the mineral acid and base from the byproduct salt solution and provide the mineral acid to at least one of the mill and process plant, wherein the byproduct salt solution comprises an organic contaminant, wherein the electrochemical acid generation plant removes greater than about 50% of the organic contaminant to form a purified salt solution, and wherein the purified salt solution is introduced into the at least one of a chloralkali cell and bipolar membrane electrodialysis cell to form the acid component and base; and
providing, by a cogen plant, electrical energy and waste heat to at least one of the mill and process plant.

29. The method of claim 28, wherein the acid component is hydrochloric acid, wherein the salt in the byproduct salt solution is one or both of sodium chloride and potassium chloride, wherein the base is one or more of sodium hydroxide and potassium hydroxide, and wherein the valuable metal product is a rare earth oxide.

30. The method of claim 28, wherein the at least one of a chloralkali cell and bipolar membrane electrodialysis cell is the bipolar membrane electrodialysis cell, wherein the valuable metal-containing mineral further comprises one or more of copper, beryllium, nickel, iron, lead, molybdenum, and manganese, wherein the acid component is nitric acid, wherein the salt in the byproduct salt solution is one or both of sodium nitrate and potassium nitrate, and wherein the base is one or both of sodium hydroxide and potassium hydroxide.

31. The method of claim 28, wherein the at least one of a chloralkali cell and bipolar membrane electrodialysis cell is the bipolar membrane electrodialysis cell, wherein the valuable metal-containing mineral further comprises uranium, wherein the acid component is phosphoric acid, wherein the salt in the byproduct salt solution is one or more of sodium phosphate and potassium phosphate, and wherein the base is one or more of sodium hydroxide and potassium hydroxide.

32. The method of claim 28, wherein the at least one of a chloralkali cell and bipolar membrane electrodialysis cell is the bipolar membrane electrodialysis cell, wherein the valuable metal-containing mineral further comprises one or more of a platinum group metal, copper, beryllium, nickel, iron, lead, molybdenum, aluminum, germanium, uranium, gold, silver, cobalt, zinc, cobalt, tin, titanium, chromium, and manganese, wherein the salt in the byproduct salt solution is one or more of sodium sulfate and potassium sulfate, wherein the acid component is sulfuric acid, and wherein the base is one or both of sodium hydroxide and potassium hydroxide.

33. The method of claim 28, wherein the valuable metal-containing mineral further comprises one or more of yttrium, scandium, a lanthanide, a platinum group metal, copper, chromium, beryllium, nickel, iron, lead, molybdenum, aluminum, germanium, uranium, gold, silver, cobalt, zinc, cobalt, tin, titanium, and manganese, wherein the salt in the byproduct salt solution is one or more of sodium chloride and potassium chloride, wherein the acid component is hydrochloric acid, and wherein the base is one or both of sodium hydroxide and potassium hydroxide.

34. The method of claim 28, wherein the acid component is hydrochloric acid, wherein the electrochemical acid generation plant produces hydrogen gas and chlorine gas, and reacts chlorine gas with hydrogen gas to produce hydrochloric acid.

35. The method of claim 28, wherein the electrochemical acid generation plant:
removes greater than about 50% of a selected polyvalent impurity from the byproduct salt solution to form a purified salt solution; and
introduces the purified salt solution into the at least one of a chloralkali cell and bipolar membrane electrodialysis cell to form the acid component and base.

36. The method of claim 35, wherein the selected polyvalent impurity is a cation, wherein the selected polyvalent cation is removed by precipitation induced by a pH change resulting from contact of the base with the byproduct salt solution, and wherein the electrochemical acid generation plant:
contacts the purified salt solution with an ion exchange resin to remove additional polyvalent cationic impurities;
thereafter processes the purified salt solution by a salt concentrator to form a concentrated and purified salt solution; and
introduces a concentrated and purified solution and a mineral acid into an anolyte recirculation tank, wherein the concentrated and purified solution is introduced into the at least one of a chloralkali cell and bipolar membrane electrodialysis cell.

37. The method of claim 28, wherein the mineral acid is hydrochloric acid, wherein the electrochemical acid generation plant produces hydrogen gas and chlorine gas, and one or both of sodium hydroxide and potassium hydroxide; and wherein chlorine and one or both of sodium hydroxide and potassium hydroxide are used to produce one or both of sodium hypochlorite and potassium hypochlorite.

38. The method of claim 35, wherein the selected polyvalent impurity is calcium.

39. The method of claim 36, wherein the selected polyvalent impurity is calcium.

40. A process, comprising:
contacting a valuable metal-containing material with a leaching solution to form a pregnant leach solution comprising a dissolved valuable metal;
recovering the dissolved valuable metal to form a valuable metal product, wherein a byproduct salt solution derived from reaction of an acid and a base is produced by at least one of the contacting and recovering steps, the byproduct salt solution comprising fluorine, wherein the valuable metal is a rare earth, wherein the acid component is hydrochloric acid, wherein the salt in the byproduct salt solution is one or more of sodium chloride and potassium chloride, wherein the base is one or more of sodium hydroxide and potassium hydroxide, and wherein the valuable metal product is a rare earth oxide;

removing greater than about 50% of the fluorine from the byproduct salt solution to form a purified byproduct salt solution;

converting, by at least one of a chloralkali cell and bipolar membrane electrodialysis cell, the byproduct salt solution into the acid and the base; and recycling the acid and/or base to at least one of the contacting and recovering steps.

41. The process of claim 40, wherein at least about 85% of the fluorine is removed from the byproduct salt solution, wherein greater than about 50% of the byproduct salt solution is converted into the acid and base and wherein greater than about 50% of the acid and base are recycled.

42. The process of claim 40, wherein the at least one of a chloralkali cell and bipolar membrane electrodialysis cell is the bipolar membrane electrodialysis cell.

43. The process of claim 40, wherein the acid is hydrochloric acid, wherein the converting step produces hydrogen gas and chlorine gas and wherein the converting step further comprises:

reacting chlorine gas with hydrogen gas to produce hydrochloric acid.

44. The process of claim 40, wherein the converting step comprises:

removing greater than about 50% of a selected polyvalent impurity from the byproduct salt solution to form a first purified salt solution;

removing greater than about 50% of a selected organic contaminant from the first purified salt solution to form a second purified salt solution, the selected organic contaminant comprises one or more of a dissolved solvent extraction resin, a dissolved ion exchange resin, a surfactant, a flotation reagent, a coagulant, and a flocculant; and introducing the second purified salt solution into the at least one of a chloralkali and bipolar membrane electrodialysis cell to form the acid component and base.

45. The process of claim 44, wherein the selected polyvalent impurity is a cation, wherein the selected polyvalent cation is removed by precipitation induced by a pH change resulting from contact of the base with the byproduct salt solution, and wherein the introducing step comprises:

contacting the purified salt solution with an ion exchange resin to remove additional polyvalent cationic impurities;

thereafter processing the purified salt solution by a salt concentrator to form a concentrated and purified salt solution; and introducing a concentrated and purified solution and a mineral acid into an anolyte recirculation tank, wherein the concentrated and purified solution is introduced into the at least one of a chloralkali cell and bipolar membrane electrodialysis cell.

46. The process of claim 40, further comprising:

receiving electrical energy from a cogen plant, the electrical energy being used in one or more of the contacting, recovering, converting and recycling steps;

receiving waste heat from the cogen plant, the waste heat being used in one or more of the contacting, recovering, converting and recycling steps.

47. The process of claim 40, further comprising:

maintaining an approximate stoichiometric balance between chlorine and hydrogen gas produced in the converting step.

48. The process of claim 40, wherein the byproduct salt solution comprises an organic contaminant and wherein the converting step comprises:

removing greater than about 50% of the organic contaminant to form a purified salt solution, wherein the purified salt solution is introduced into the at least one of a chloralkali and bipolar membrane electrodialysis cell to form the acid and base.

49. The process of claim 44, wherein the selected polyvalent impurity is calcium.

50. The process of claim 45, wherein the selected polyvalent impurity is calcium.

51. The process of claim 40, wherein the byproduct salt solution comprises more than about 400 ppb monovalent fluorine and wherein the fluorine is removed by at least one of passing the byproduct salt solution through an aluminum oxide polishing column and passing the byproduct salt solution through a rare earth-containing column.

52. The process of claim 44, wherein the selected polyvalent impurity is one or more of: more than about 20 ppb divalent calcium, more than about 20 ppb divalent magnesium, more than about 100 ppb divalent strontium, more than about 500 ppb divalent barium, more than about 100 ppb trivalent aluminum, more than about 1 ppm trivalent iron, more than about 15 ppm divalent mercury, more than about 10 g/L divalent sulfate anion, more than about 100 ppm radioactive nuclides and daughters thereof, more than about 10 ppm silica, and more than about 10 ppb divalent nickel, wherein the second purified solution comprises no more than about 20 ppb divalent calcium and magnesium, no more than about 100 ppb divalent strontium, no more than about 500 ppb divalent barium, no more than about 100 ppb trivalent aluminum, no more than about 1 ppm trivalent iron, no more than about 15 ppm divalent mercury, no more than about 10 g/L divalent sulfate anion, no more than about 10 ppm silica (in the presence of divalent calcium and trivalent aluminum), no more than about 400 ppb monovalent iodine (in the presence of divalent barium), and no more than about 10 ppb divalent nickel, and wherein polyvalent impurity removing step comprises the substeps:

contacting the base with the byproduct salt solution to increase a pH of the byproduct salt solution to a pH of at least about pH 9 to precipitate a first part of the selected polyvalent impurity;

removing the precipitated selected polyvalent impurity from the byproduct salt solution to form a treated byproduct salt solution, the treated byproduct salt solution comprising unprecipitated selected polyvalent impurity;

contacting the treated byproduct salt solution with an ion exchange resin to remove a part of the unprecipitated selected polyvalent impurity and form a further treated byproduct salt solution, the further treated byproduct salt solution comprising unremoved selected polyvalent impurity; and contacting the further treated byproduct salt solution with a mixed bed of anion and cation exchange resins to remove the unremoved selected polyvalent impurity and form the first purified salt solution, wherein the contaminant removal steps are conducted to maintain greater than about 50% of the salt cation and anion in solution.

53. The process of claim 52, wherein the ion exchange resin is substantially free of phosphate groups.

54. A method, comprising:
(a) receiving an aqueous salt solution;
(b) electrochemically generating an acid and a base from the aqueous salt solution;
(c) dissolving a plurality of rare earths from a valuable metal-containing feed material to form a rare earth-containing solution, the acid and/or base being used in the dissolving step (c) and the rare earth-containing solution comprising dissolved cerium (III) and multiple other dissolved rare earths;
(d) selectively oxidizing cerium in the presence of the multiple other dissolved rare earths to form cerium (IV) while maintaining the multiple other dissolved rare earths in a non-oxidized state and thereby precipitate the oxidized rare earth while leaving the at least one other non-oxidized rare earth in solution;
(e) separating the oxidized rare earth precipitate from the non-oxidized rare earth; and
(f) thereafter separating the multiple other dissolved rare earths in the non-oxidized state from one another by one or more of ion exchange, liquid-liquid extraction, reduction to metal by reaction with a more electropositive metal, electrolytic reduction, fractional distillation, and zone melting.

55. The method of claim 54, wherein the multiple other rare dissolved rare earths are separated from one another by ion exchange, wherein the ion exchange separation of the multiple other dissolved rare earths is a phosphate-free resin, wherein the multiple other rare earths are removed from the resin by an eluant comprising citric acid, an aminopolycarboxylate, or a monovalent salt, wherein the eluant comprises a complexing agent exhibiting different affinities for the multiple other dissolved rare earths, and wherein the multiple rare earths are in the trivalent oxidation state.

56. The method of claim 54, wherein the cerium (IV) is ceric hydroxide, wherein cerium (III) is selectively oxidized by hydrogen peroxide or sodium hypochlorite, and wherein hydrated cerium oxide is subsequently precipitated by adjusting the pH of the rare earth-containing solution to a pH of at least about pH 3.

57. The method of claim 56, wherein the adjusted pH ranges from about pH 3 to about pH 7.

58. The process of claim 54, wherein the multiple other rare dissolved rare earths are separated from one another by liquid-liquid extraction, wherein the liquid-liquid extraction uses an acidic, basic, and/or neutral extractant, wherein the extractant is one or more of a carboxylic acid, organophosphorus acid and ester thereof, tetraalkylammonium salt, alcohol, ether and ketone, and wherein the multiple rare earths are in the trivalent oxidation state.

59. The process of claim 54, wherein the multiple other rare dissolved rare earths are separated from one another by one or more of reduction to metal by reaction with a more electropositive metal, electrolytic reduction, fractional distillation, and zone melting and wherein the multiple rare earths are in the trivalent oxidation state.

60. A process, comprising:
contacting a valuable metal-containing material with an acidic leaching solution having an acid component to form a pregnant leach solution comprising a dissolved valuable metal;
recovering the dissolved valuable metal to form a valuable metal product and a byproduct salt solution, the byproduct salt solution is derived from reacting a base with the acid component, wherein the valuable metal is a rare earth, wherein the acid component is hydrochloric acid, wherein the salt in the byproduct salt solution is one or more of sodium chloride and potassium chloride, wherein the base is one or more of sodium hydroxide and potassium hydroxide, and wherein the valuable metal product is a rare earth oxide;
removing greater than about 50% of a selected contaminant from a byproduct salt solution, wherein the selected contaminant is one or both of:
(i) an organic contaminant, wherein the organic contaminant is removed from the byproduct salt solution to form a purified salt solution, the selected organic contaminant comprises one or more of a dissolved solvent extraction resin, a dissolved ion exchange resin, a surfactant, a flotation reagent, a coagulant, and a flocculant, and
(ii) an inorganic contaminant, wherein the inorganic contaminant is removed from the byproduct salt solution to form a purified salt solution, the inorganic contaminant comprises fluorine;
electrochemically converting the purified salt solution into the acid component and the base;
recycling the acid component of the electrochemically converting step to the contacting step; and
recycling the base of the electrochemically converting step to at least one of the contacting and recovering steps.

61. The process of claim 60, wherein the electrochemically converting step is performed by at least one of a chloralkali and bipolar membrane electrodialysis cell, wherein greater than about 50% of the byproduct salt solution is converted into the acid component and base and wherein greater than about 50% of the acid component and base are recycled.

62. The process of claim 60, wherein the electrochemically converting step is performed by at least one of a chloralkali and bipolar membrane electrodialysis cell.

63. The process of claim 60, wherein the converting step produces hydrogen gas and chlorine gas, and wherein the electrochemically converting step further comprises:
reacting chlorine gas with hydrogen gas to produce hydrochloric acid.

64. The process of claim 60, wherein the converting step comprises:
introducing the purified salt solution into the at least one of a chloralkali and bipolar membrane electrodialysis cell to form the acid component and base.

65. The process of claim 60, wherein the electrochemically converting step is performed by at least one of a chloralkali and bipolar membrane electrodialysis cell, wherein the selected contaminant is a cation, wherein the cation is removed by precipitation induced by a pH change resulting from contact of the base with the byproduct salt solution, and wherein the introducing step comprises:
contacting the first purified salt solution with an ion exchange resin to remove additional polyvalent cationic impurities;
thereafter processing the purified salt solution by a salt concentrator to form a concentrated and purified salt solution; and
introducing the concentrated and purified solution and a mineral acid into an anolyte recirculation tank, wherein the concentrated and purified solution is introduced into the at least one of a chloralkali and bipolar membrane electrodialysis cell.

66. The process of claim 60, wherein the acid component is hydrochloric acid, wherein the converting step produces hydrogen gas and chlorine gas, and one or both of sodium hydroxide and potassium hydroxide; and further wherein chlorine and one or both of sodium hydroxide and potassium hydroxide are used to produce one or both of sodium hypochlorite and potassium hypochlorite and further comprising:

receiving electrical energy from a cogen plant, the electrical energy being used in two or more of the contacting, recovering, converting and recycling steps;

receiving waste heat from the cogen plant, the waste heat being used in two or more of the contacting, recovering, converting and recycling steps.

67. The process of claim 60, wherein the electrochemically converting step is performed by a chloralkali cell, further comprising:

maintaining an approximate stoichiometric balance between chlorine and hydrogen gas produced in the converting step.

68. The process of claim 60, wherein the electrochemically converting step is performed by at least one of a chloralkali cell and bipolar membrane electrodialysis cell, wherein the organic contaminant is removed by one or more of vacuum distillation, pervaporation, steam stripping, sorption, and membrane filtration.

69. The process of claim 60, wherein, in each of the recycle steps, the acid component and base are concentrated and/or pH adjusted.

\* \* \* \* \*

UNITED STATES PATENT AND TRADEMARK OFFICE
CERTIFICATE OF CORRECTION

| | | |
|---|---|---|
| PATENT NO. | : 8,936,770 B2 | Page 1 of 1 |
| APPLICATION NO. | : 13/010609 | |
| DATED | : January 20, 2015 | |
| INVENTOR(S) | : John L. Burba, III | |

It is certified that error appears in the above-identified patent and that said Letters Patent is hereby corrected as shown below:

In the Claims

At column 33, line 20, claim 68, please delete the word "pervaporation" and replace it with --perevaporation-- therein.

Signed and Sealed this
Fifth Day of May, 2015

Michelle K. Lee
*Director of the United States Patent and Trademark Office*